United States Patent
Lee et al.

(10) Patent No.: US 11,443,537 B2
(45) Date of Patent: Sep. 13, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Seongoh Lee, Suwon-si (KR); Youngmin Kwak, Suwon-si (KR); Sungbae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/022,516

(22) Filed: Sep. 16, 2020

(65) Prior Publication Data

US 2021/0110220 A1    Apr. 15, 2021

(30) Foreign Application Priority Data

Oct. 15, 2019    (KR) .................. 10-2019-0127385

(51) Int. Cl.
*G06K 9/00*    (2022.01)
*G06V 30/194*    (2022.01)

(52) U.S. Cl.
CPC .................................. *G06V 30/194* (2022.01)

(58) Field of Classification Search
CPC .. G06K 9/66; G06K 9/00; G06T 11/60; G06T 3/40; G06T 2210/36; G11B 27/031
See application file for complete search history.

(56) References Cited

U.S. PATENT DOCUMENTS

| | | |
|---|---|---|
| 10,147,459 B2 | 12/2018 | Rymkowski et al. |
| 10,713,794 B1 * | 7/2020 | He ................. G06N 3/0454 |
| 10,839,226 B2 * | 11/2020 | Chu ..................... G06V 10/82 |
| 2018/0068463 A1 | 3/2018 | Risser |
| 2018/0082715 A1 | 3/2018 | Rymkowski et al. |
| 2018/0150947 A1 | 5/2018 | Lu et al. |
| 2018/0158224 A1 | 6/2018 | Bethge et al. |
| 2018/0357800 A1 | 12/2018 | Oxholm et al. |
| 2019/0220746 A1 * | 7/2019 | Liu ..................... G06K 9/6262 |
| 2019/0244329 A1 * | 8/2019 | Li ......................... G06N 3/084 |
| 2019/0370936 A1 * | 12/2019 | Zhang .................. G06T 3/4046 |
| 2020/0151938 A1 * | 5/2020 | Shechtman .............. G06N 3/08 |

(Continued)

FOREIGN PATENT DOCUMENTS

KR    10-2015-0093342    8/2015

OTHER PUBLICATIONS

A Neural Algorithm of Artistic Style. arXiv preprint arXiv:1508.06576, 2015, 1-16 (Year: 2015).*

(Continued)

*Primary Examiner* — Oneal R Mistry
(74) *Attorney, Agent, or Firm* — Nixon & Vanderhye P.C.

(57) ABSTRACT

Disclosed is an electronic apparatus. The disclosed electronic apparatus may include at least one processor and at least one memory, in which the memory may include at least one instruction, which, when executed, causes the processor to: identify a feature of at least one object included in a first image, identify a feature of at least one object included in a second image acquired by applying the first image to a first neural network, determine an image processing method based on the identification, and acquire a plurality of third images based on the determined image processing method.

20 Claims, 16 Drawing Sheets

(6 of 16 Drawing Sheet(s) Filed in Color)

(56) References Cited

U.S. PATENT DOCUMENTS

| | | | |
|---|---|---|---|
| 2020/0202502 A1* | 6/2020 | Tsymbalenko | G06T 5/50 |
| 2020/0250460 A1* | 8/2020 | Wang | G06V 10/443 |
| 2020/0302180 A1* | 9/2020 | Zhang | G06N 3/0445 |

OTHER PUBLICATIONS

International Search Report and Written Opinion dated Jan. 20, 2021 in corresponding International Application No. PCT/KR2020/013057.

* cited by examiner

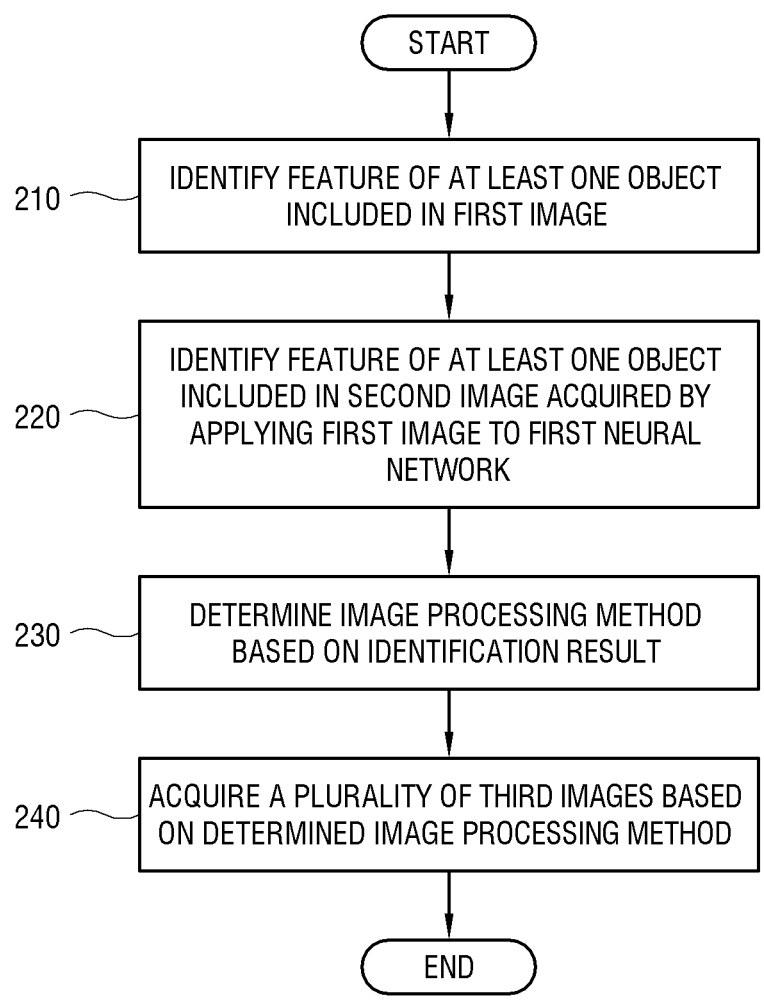

ELECTRONIC APPARATUS AND CONTROLLING METHOD THEREOF

CROSS-REFERENCE TO RELATED APPLICATION

This application is based on and claims priority under 35 U. S. C. § 119 to Korean Patent Application No. 10-2019-0127385, filed on Oct. 15, 2019, in the Korean Intellectual Property Office, the disclosure of which is incorporated by reference herein in its entirety.

BACKGROUND

1. Field

The disclosure relates to an electronic apparatus and a controlling method thereof, and for example, to a method of providing a process of changing a style of a selected image.

2. Discussion of Related Art

With the spread and technology development of electronic apparatuses including a display, electronic apparatuses having various types and functions have been developed.

For example, products that may use an electronic apparatus as a picture frame for displaying a predetermined screen such as a picture or a masterpiece are on the market. For example, unless a user is watching predetermined content through an electronic apparatus, a predetermined screen, for example, a screen including a famous picture or a picture may be output. In this case, the user may use the electronic apparatus as a famous picture frame or a large picture frame.

In this case, the electronic apparatus may use a style transfer algorithm to display an image having a style modified according to a user's taste. In recent years, an artificial intelligence algorithm may be used to change the style of the image.

Changing the style of the image using the artificial intelligence algorithm takes a longer time than changing the style of the image using the style transfer algorithm, and as a result, there may be an inconvenience that users cannot view the resulting image at a desired time.

SUMMARY

Embodiments of the disclosure provide a controlling method of an electronic apparatus and an electronic apparatus capable of creating and displaying images so that a user does not feel bored during the time required to create the images by performing an operation through a neural network.

According to an example embodiment, an electronic apparatus is provided, the electronic apparatus including: at least one processor; and at least one memory, the memory including at least one instruction which, when executed, may cause the processor to: identify a feature of at least one object included in a first image, identify a feature of at least one object included in a second image acquired by applying the first image to a first neural network, determine an image processing method based on the identification, and acquire a plurality of third images based on the determined image processing method.

According to an example embodiment, a method of controlling an electronic apparatus is provided, the method including: identifying a feature of at least one object included in a first image; identifying a feature of at least one object included in a second image acquired by applying the first image to a first neural network; determining an image processing method based on the identifying; and acquiring a plurality of third images based on the determined image processing method.

According to an embodiment of the disclosure, the electronic apparatus may display the process of transferring the style of the image.

According to an embodiment of the disclosure, the electronic apparatus may increase a similarity between the created image using the artificial intelligence algorithm and the created image using the style transfer algorithm.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The above and other aspects, features, and advantages of certain embodiments of the present disclosure will be more apparent from the following detailed description, taken in conjunction with the accompanying drawings, in which:

FIG. 2 is a flowchart illustrating an example method in which the electronic apparatus acquires a plurality of images using a simulation based style transfer according to an embodiment;

DETAILED DESCRIPTION

Figure 1:
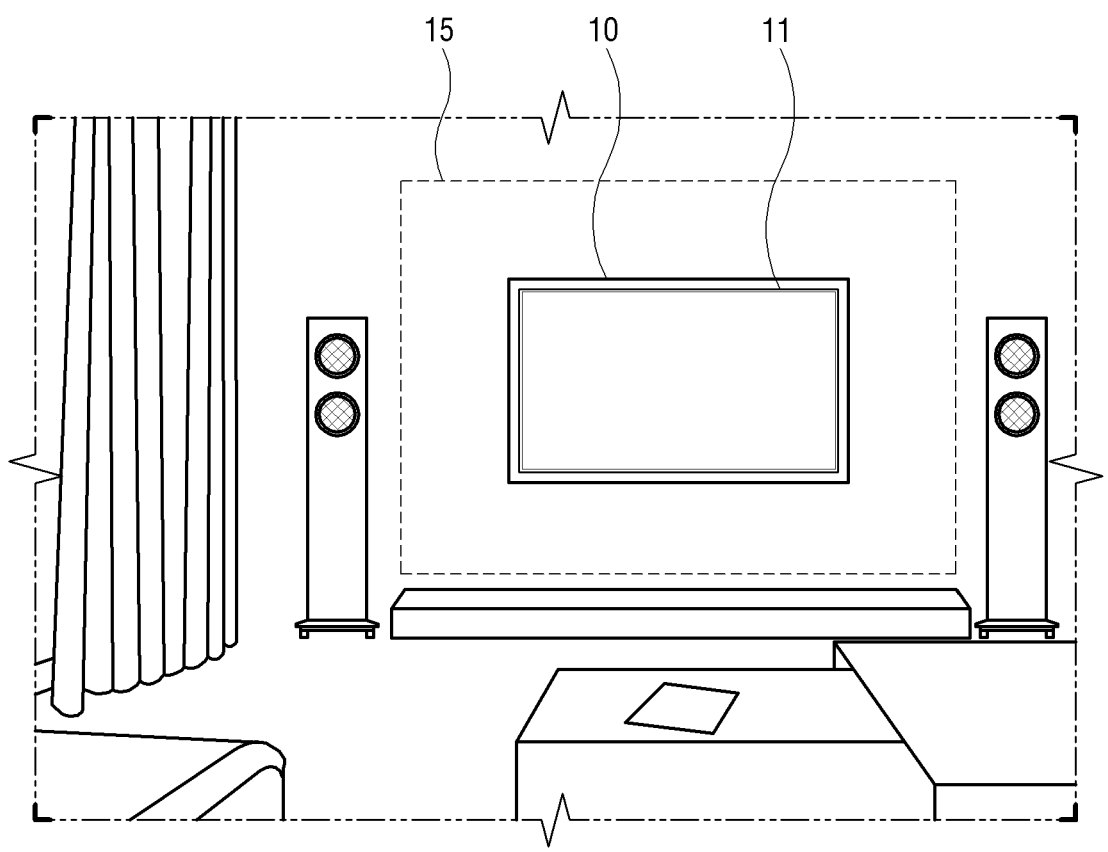
FIG. 1 is a diagram illustrating an example in which an electronic apparatus is arranged and used in a predetermined space according to an embodiment.

Hereinafter, various example embodiments of the disclosure will be described in greater detail with reference to the accompanying drawings. However, the disclosure may be implemented in various different forms, and is not limited to the various example embodiments described herein. In addition, in the drawings, portions unrelated to the description may be omitted, and similar reference numerals are attached to similar portions throughout the specification.

Throughout the present disclosure, when any one part is referred to as being "connected to" another part, any one part and another part may be "directly connected to" each other or are "electrically connected to" each other with the other part interposed therebetween. In addition, unless explicitly described to the contrary, "including" any component will be understood to imply the inclusion of other components rather than the exclusion of other components.

Phrases such as "in some embodiments" or "in one embodiment" appearing in various places in this disclosure are not necessarily all referring to the same embodiment.

Some embodiments may be represented by functional block configurations and various processing steps. Some or all of these functional blocks may be implemented by various numbers of hardware and/or software components that perform specific functions. For example, the functional blocks of the disclosure may be implemented by one or more processors or microprocessors, or may be implemented by circuit configurations for a predetermined function. In addition, for example, the functional blocks of the disclosure may be implemented in various programming or scripting languages. Functional blocks may be implemented as algorithms executed by one or more processors. In addition, the disclosure may employ a conventional technology for electronic environment setting, signal processing, and/or data processing, and the like. Terms such as modules and configurations may be widely used, and are not limited to mechanical and physical configurations.

In addition, connecting lines or connecting members between the components illustrated in the drawings are merely illustrative of functional connections and/or physical or circuit connections. In an actual apparatus, connections between components may be represented by various functional connections, physical connections, or circuit connections that can be replaced or added. In addition, the description of 'at least one of A and B' means 'A or B' or 'A and B'.

Hereinafter, the disclosure will be described in greater detail with reference to the accompanying drawings.

An electronic apparatus according to an embodiment of the disclosure may include all electronic devices that visually output predetermined content. For example, the electronic apparatus according to an embodiment of the disclosure may include all electronic devices capable of selectively displaying at least one content, and may exist as various types such as, for example, and without limitation, a TV, a digital broadcasting terminal, a tablet PC, a mobile phone, a computer, a notebook computer, or the like. In addition, the electronic apparatus may have not only a fixed type, but also a mobile type or a type that a user can carry.

According to an embodiment of the disclosure, the electronic apparatus may transmit and receive data through a wireless network with an external apparatus. The external apparatus may be a server, an electronic apparatus, or the like capable of communicating with the electronic apparatus through a wireless communication network, an electronic apparatus, and the like. For example, the external apparatus may be a server or an electronic apparatus that can transmit and receive predetermined data to and from the electronic apparatus, can be paired with the electronic apparatus, can remotely control the electronic apparatus, or can be remotely controlled from the electronic apparatus. For example, the external apparatus may be a computing device such as a smart phone, a tablet PC, a PC, a personal digital assistant (PDA), a laptop computer, a media player, a server, or a micro server.

FIG. 1 is a diagram illustrating an example situation in which an electronic apparatus is arranged and used in a predetermined space according to an embodiment.

Referring to FIG. 1, an electronic apparatus 10 may be arranged in a certain space. The electronic apparatus 10 may include an apparatus that outputs various content (for example, image, moving image, and the like) using a display 11. For example, the electronic apparatus 10 may exist in various forms, such as a TV or a digital broadcasting terminal. According to various embodiments, the electronic apparatus 10 may have not only a fixed type, but also a mobile type or a type that a user can carry.

Referring to FIG. 1, the electronic apparatus 10 may be arranged attached to a certain wall surface 15 in the form of a wall mount that is detachable from a wall surface 15. The electronic apparatus 10 may execute an ambient function of displaying a preset image on the display 11 while not playing a predetermined content. The ambient function may refer, for example, to a function of displaying a preset image on at least a partial area of the display 11 instead of a black screen, in a situation in which the electronic apparatus 10 is in a power saving state (or a sleep state). The power saving state may refer, for example, to a state in which a processor of the electronic apparatus 10 controls only some of a plurality of components included in the electronic apparatus 10 or executes only functions related to some components.

According to an embodiment, when executing the ambient function, the electronic apparatus 10 may display an image corresponding to a user's intention, taste, and/or setting. To this end, the electronic apparatus 10 may use a style transfer technology.

The style transfer may refer, for example, to acquiring a new image by transferring a style of an image with reference to other styles while maintaining the content of the image. One image to be transferred may be an image digitized with a general digital camera or a scanner, or may be an image newly created using a painting program.

Examples of other styles may include styles of paint such as watercolor, oil painting, ink painting, pointillism, and three-dimensional painting, and may be referred to as particular painter's styles such as Van Gogh, Monet, Manet, and Picasso style. In addition, the style may be classified into different styles according to the color, atmosphere, predetermined brightness, and predetermined saturation of the image. In addition, certain works, such as Van Gogh's starry night and sunflower style, can also be referred to as style. In addition, the 'style' used in an embodiment of the disclosure may include those that can represent a style of painting or style other than the above-described example.

According to an embodiment, referring to other styles may refer, for example, to changing the one image in consideration of, for example, a color value, a brightness value, and a saturation value included in other images. Referring to other styled may refer, for example, to changing one image by applying color values, saturation values, and brightness values of other images while maintaining a main edge component included in the one image. Referring to other styles may refer, for example, to changing the one image by extracting main objects included in other images and including the extracted main objects in the one image. However, referring to other styles is not limited to the above-described embodiment.

According to an embodiment, the style transfer technology may include a method of analyzing, by an electronic apparatus, an image and automatically process an image using a predefined style. In addition, the style transfer technology may include a method of transferring a style of an image using an artificial intelligence (AI) technology that performs an operation using a neural network.

Hereinafter, a style transfer that performs image processing using a predefined style after analyzing an image may be referred to as "simulation based style transfer". In addition, the style transfer performed using the artificial intelligence technology may be referred to as an "artificial intelligence-based style transfer method".

According to an embodiment, the style to which the simulation based style transfer applies to create an output image may include a predefined style. A manufacturer or a program developer of the electronic apparatus 10 needs to develop technologies for each style applied to the simulation based style transfer, and needs to develop and produce texture images or image resources corresponding to the styles to represent the styles. Since the simulation based style transfer requires investment of time and manpower cost whenever a new style is developed, there may be a limit to the expansion of styles and the diversification of style types.

The artificial intelligence (AI)-based style transfer method may create more creative images than the simulation based style transfer. In addition, artistry of an image may increase by increasing originality, and an image that more suits needs of users who do not want a general image may be created. In addition, the artificial intelligence-based style transfer method need not separately develop the texture images or image resources corresponding to each style like the simulation based style transfer. For example, the artificial intelligence-based style transfer method may output an image transferred into a predetermined style based on the operation of the neural network when an original image and an image having a style to be imitated are applied to a neural network.

According to an embodiment, transferring the style of the image using the artificial intelligence-based style transfer method may take a longer time than transferring the style of the image using the simulation based style transfer.

Therefore, the electronic apparatus 10 according to an embodiment may display a plurality of images created using the simulation based style transfer on the display 11 while transferring the style of the image using the artificial intelligence-based style transfer method. The plurality of images created using the simulation based style transfer may be sequentially displayed on the display 11 in the order in which the images are acquired. The electronic apparatus 10 may display the plurality of images, and then uses the artificial intelligence-based style transfer method to display the acquired image on the display 11. As a result, the user can check the process of changing one image to an image having transferred style by applying the style transfer process to the one image.

Hereinafter, a process of acquiring, by the electronic apparatus 10, a plurality of images using the simulation based style transfer will be described with reference to FIGS. 2, 3A, 3B, 4, 5 and 6.

Figure 3A:
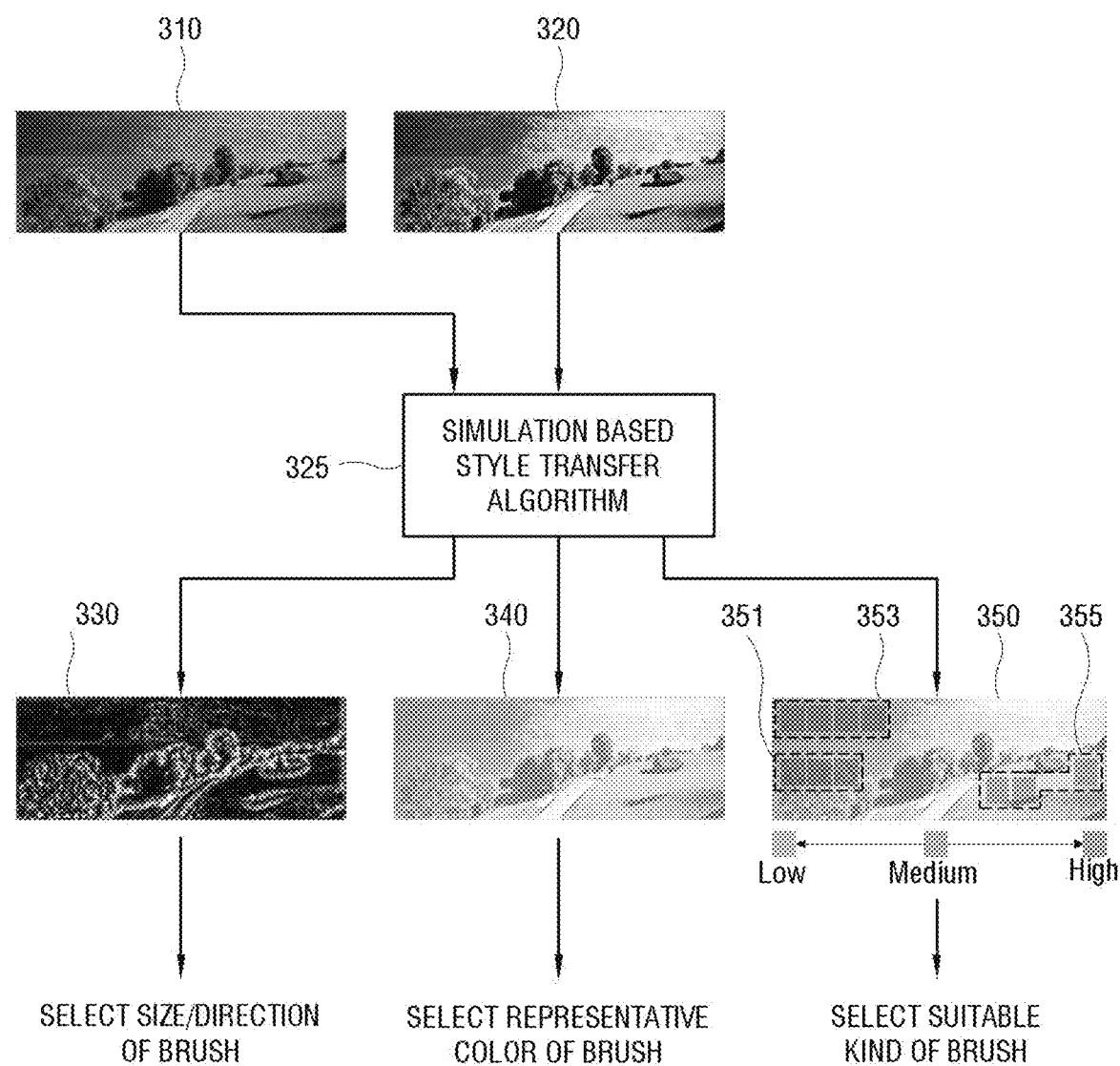
FIGS. 3A and 3B are block diagrams illustrating an example which the electronic apparatus acquires the plurality of images using the simulation based style transfer according to an embodiment.
Figure 3B:
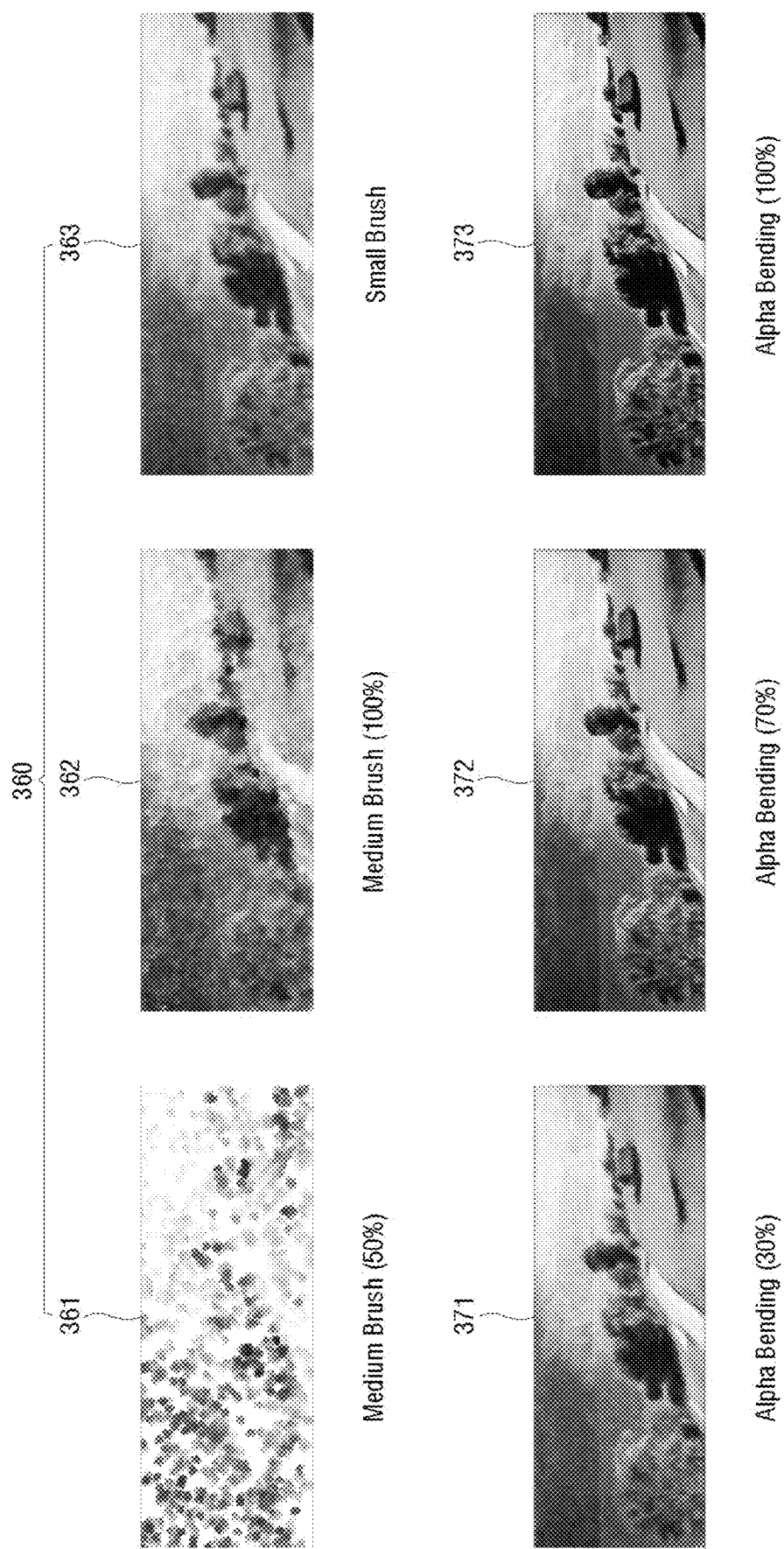

FIG. 2 is a flowchart illustrating an example in which the electronic apparatus acquires the plurality of images using the simulation based style transfer according to an embodiment, and FIGS. 3A and 3B are block diagrams illustrating an example in which the electronic apparatus acquires the plurality of images using the simulation based style transfer according to an embodiment.

Referring to operation 210 of FIG. 2, the electronic apparatus 10 may identify features of at least one object included in a first image. The first image may be, for example, an original image to be transferred by the electronic apparatus 10. The features of the object may include, for example, at least one of the shapes, textures, or colors of the objects.

Referring to FIG. 3A, the electronic apparatus 10 may acquire a first image 310. The first image 310 may include, for example, an image received by the electronic apparatus 10, an image already stored by the electronic apparatus 10, an image input by a user for style transfer, or an image transmitted from an external apparatus for style transfer.

According to an embodiment, the electronic apparatus 10 may identify features of at least one object (or area) included in the first image 310. For example, the electronic apparatus 10 may identify objects such as trees, roads, houses, water, mountains, and fields included in the first image 310. The electronic apparatus 10 may acquire gradients of objects such as identified trees, roads, houses, water, mountains, and fields to acquire edge information of the objects, thereby identifying the shape. In addition, the electronic apparatus 10 may identify colors of objects such as the identified trees, roads, houses, water, mountains, and fields. In addition, the electronic apparatus 10 may identify texture using frequencies of objects such as the identified trees, roads, houses, water, mountains, and fields.

According to an embodiment, the electronic apparatus 10 may acquire a reference style that is referenced when transferring the first image 310. For example, the electronic apparatus 10 may display names of at least one reference style on the display and acquire the reference styles based on a user input for selecting one of the displayed names of reference styles. The electronic apparatus 10 may display names of at least one reference style on the display and acquire the reference styles based on the user input for selecting one of the displayed names of reference styles.

Referring to operation 220 of FIG. 2, the electronic apparatus 10 may apply the first image to the first neural network to identify features of at least one object included in an acquired second image.

According to an embodiment, the electronic apparatus 10 may acquire a second image 320 by applying the first image 310 and the reference style selected by the user to the first neural network. The first neural network may be a neural network trained using, as training data, an original image, an image to refer to the style, and an image in which the original image changes by referring to the style.

Contents of the electronic apparatus 10 acquiring the second image 320 by applying the first image 310 to the first neural network will be described in greater detail below with reference to FIGS. 5 and 6.

According to an embodiment, the electronic apparatus 10 may identify features of at least one object (or area) included in the second image 320. For example, the electronic apparatus 10 may identify objects such as trees, roads, houses, water, mountains, and fields included in the second image 320. The electronic apparatus 10 may acquire gradients of objects such as identified trees, roads, houses, water, mountains, and fields to acquire edge information of the objects, thereby identifying the shape. In addition, the electronic apparatus 10 may identify colors of objects such as the identified trees, roads, houses, water, mountains, and fields. In addition, the electronic apparatus 10 may identify texture using frequencies of objects such as the identified trees, roads, houses, water, mountains, and fields.

According to various embodiments, the electronic apparatus 10 may use a heuristic rule to analyze the shapes, colors, or textures of at least one object identified in the first image 310 and the second image 310, respectively. For example, the electronic apparatus 10 may identify the form (or shape) of the object in the first image 310 and identify the color of the object in the second image 320. In addition, the electronic apparatus 10 may use the frequency acquired from the second image 320 to identify the texture of the object. In this case, the electronic apparatus 10 may use the first image 310 in a high frequency region to identify the texture of the object.

Referring to operation 230 of FIG. 2, the electronic apparatus 10 may determine an image processing method based on the identification results. For example, when acquiring an image using the simulation based style transfer, the electronic apparatus 10 may use the information acquired from the first image 310 and the information acquired from the second image 320.

Referring to FIG. 3A, the electronic apparatus 10 may determine at least one of the shapes, textures, or colors that are to be applied to the objects included in the image to be created or one area of the image by applying at least one of the shapes, textures, or colors of at least one object identified using the first image 310 and the second image 320 to the simulation based style transfer algorithm 325.

For example, the electronic apparatus 10 may determine the image processing method including a brush effect such as creating objects while adding points, faces, or lines having various sizes to images without objects using a paint brush (or brush) based on the information on the identified shapes, textures, or colors. According to various embodiments, creating the objects while adding points, faces, or lines may refer, for example, to creating objects in images while changing a red (R) value, a green (G) value, and a blue (B) value, transparency of R, G, and B colors, or the like.

According to an embodiment, the electronic apparatus 10 may use the edge information acquired from the first image 310 to acquire a shape analysis image 330. The electronic apparatus 10 may use gradient information acquired from the shape analysis image 330 to select (or determine) the magnitude and direction of the brush effect. For example, the electronic apparatus 10 may identify a bright area and a dark area acquired using the edge information, and acquire information on the strength and weakness of the edge according to the arrangement of the bright area and the dark area as inclination information. In this case, the electronic apparatus 10 may acquire the magnitude of the gradient and the direction of the gradient.

According to an embodiment, the electronic apparatus 10 may reduce the size of the brush when the sum of the magnitudes of the area of the image corresponding to the size of the currently selected brush exceeds a threshold value. In addition, the electronic apparatus 10 may determine a direction in which the brush effect is added according to the direction included in the object.

According to an embodiment, the electronic apparatus 10 may use the color information acquired from the second image 320 to acquire a color analysis image 340. The electronic apparatus 10 may determine a color to be added as a brush effect in the color analysis image 340. For example, the electronic apparatus 10 may identify each area of the color analysis image 340 corresponding to the area to be added by the brush effect. The electronic apparatus 10 may acquire an intermediate value (or an average value) of the colors of the identified areas and select (or determine) a color to be added as the brush effect.

According to an embodiment, the electronic apparatus 10 may use the texture information acquired from the first image 310 and the second image 320 to acquire a texture analysis image 350. For example, the electronic apparatus 10 may acquire frequency information on each area of the first image 310 or the second image 320. The electronic apparatus 10 may select (or determine) the type of the brush effect using the acquired frequency information.

The electronic apparatus 10 may divide, for example, the first image 310 and the second image 320 into certain areas, and then acquire frequency values for each area. The electronic apparatus 10 may identify an area 351 having a high frequency value, an area 353 having an intermediate frequency value, and an area 355 having a low frequency value.

The electronic apparatus 10 may determine the brush effect corresponding to the frequency values identified for each area. For example, the electronic apparatus 10 may select the brush effect of roughly adding color to the area 351 having the high frequency value, and select the brush effect of smoothly adding color to the region 355 having the low frequency value. In addition, the electronic apparatus 10 may select the brush effect of roughly adding color to the area 353 having the intermediate frequency value, and select the brush effect having the intermediate value of the brush effect of smoothly adding color.

The brush effect in which color is roughly added may refer, for example, to an effect in which color is not evenly added to an image and color is not added to some area, or color is excessively added to some area.

The electronic apparatus 10 may determine a maximum frequency value and a minimum frequency value based on the frequency values acquired from the first image 310 and the second image 320, and then divide the frequency values therebetween into a predetermined size. Accordingly, in this drawing, only one frequency value having an intermediate value is expressed, but the disclosure is not limited thereto, and the electronic apparatus 10 may select various brush effects corresponding to various intermediate frequency values.

According to various embodiments, the electronic apparatus 10 may use at least one of the shapes, textures, or colors of the objects (for example, trees, roads, houses, water, mountains, and fields) included in the second image 320 to change at least one of the shapes, textures, or colors of the objects (trees, roads, houses, water, mountains, and fields) included in the first image 310. The electronic apparatus 10 may store at least one value of the shapes, textures, or colors of the objects included in the changed first image 310, and may use the stored value to determine the size, direction, color, and type of the brush as described above.

Referring to operation 240 of FIG. 2, the electronic apparatus 10 may acquire a plurality of third images based on the determined image processing method.

Referring to FIG. 3B, the electronic apparatus 10 may acquire a plurality of third images 360 based on the image processing method determined in the operation 240. According to an embodiment, the electronic apparatus 10 may determine the size, type, color, and the like of the brush to be used for the brush effect based on the image processing method determined in operation 230, and acquire the plurality of third images.

For example, the electronic apparatus 10 may apply the brush effect of adding colors in the form of points, lines, or faces to an empty image using a medium-sized brush. The electronic apparatus 10 may acquire a 1st third image 361 by repeatedly applying the brush effect having the medium size to the image (medium brush (50%)). The 1st third image 361 may be an image representing a step of adding representative colors corresponding to each area of the 1st third image 361 by the brush effect.

The electronic apparatus 10 may acquire a 2nd third image 362 by repeatedly applying the brush effect having the medium size to the image (medium brush (100%)). The 2nd third image 362 may be an image representing a step of revealing shapes of objects while further adding color to the 1st third image 361.

The electronic apparatus 10 may acquire a 3rd third image 363 by changing the type of brush and repeatedly applying the brush effect to the image (small brush). The electronic apparatus 10 may create the 3rd third image 363 so that the shapes of the objects are more accurately represented by applying the brush effect to the image using a brush having a smaller size than the brush used in the 1st third image 361 and the 2nd third image 362.

According to an embodiment, the electronic apparatus 10 may perform additional image processing on a last acquired third image among the plurality of third images. For example, the electronic apparatus 10 may perform additional image processing so that the shapes, colors, or textures of the objects included in the last acquired third image are similar to shapes, colors, or textures of objects included in a fourth image.

The electronic apparatus 10 may acquire the third image modified by applying an alpha blending algorithm to the last acquired third image 363 so that for example, the shapes, colors, or textures of the objects included in the last acquired third image 363 are similar to shapes, colors, or textures of objects included in a fourth image 620 to be described in greater detail below with reference to FIG. 7.

The electronic apparatus 10 may sequentially apply the alpha blending algorithm to the last acquired third image 363. For example, the electronic apparatus 10 may acquire a first modified third image 371 by applying the alpha blending algorithm at a level of 30%. The electronic apparatus 10 may acquire a second modified third image 372 by applying the alpha blending algorithm at a level of 70%, and a final modified third image 373 by applying the alpha blending algorithm at a level of 100%. The electronic apparatus 10 may display the last modified third image 373 just before displaying the fourth image 620 (refer to FIG. 6) to be described in greater detail below, so the style transfer process may be set to be viewed as a transfer process without discomfort.

Figure 4:
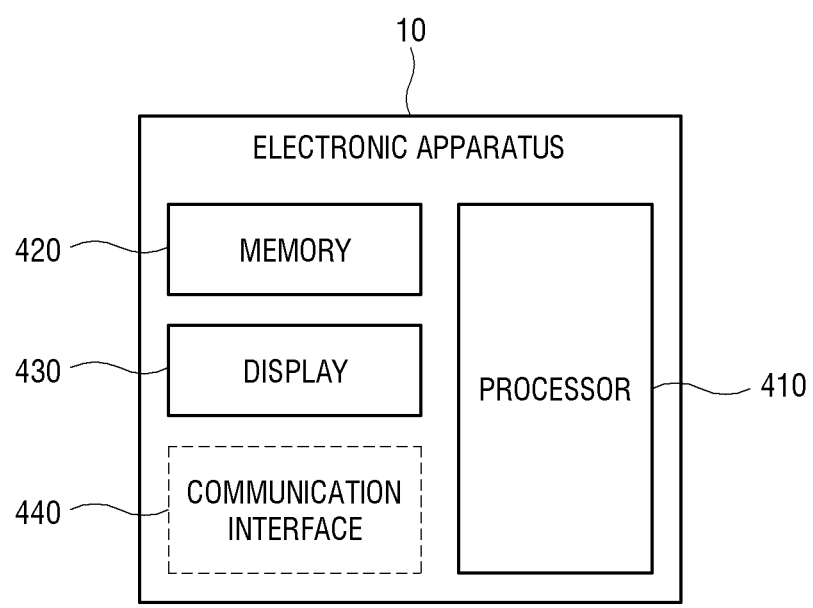
FIG. 4 is a block diagram illustrating an example electronic apparatus according to an embodiment.

FIG. 4 is a block diagram illustrating an example electronic apparatus according to an embodiment.

Referring to FIG. 4, the electronic apparatus 10 may include a processor (e.g., including processing circuitry) 410, a memory 420, and a display 430. However, the configuration of the electronic apparatus 10 is not limited thereto. The electronic apparatus 10 may not include some of the components or may further include some components. For example, the electronic apparatus 10 may further include a communication interface (e.g., including communication circuitry) 440 to transmit and receive data to and from an external apparatus.

According to an embodiment, the memory 420 may store at least one instruction. The instructions stored in the memory 420 may be executed by the processor 410.

The memory 420 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

According to an embodiment, the memory 420 may store at least one instruction set to identify features of at least one object included in the first image, apply the first image to a first neural network to identify features of at least one object included in the acquired second image, determine the image processing method based on the identification results, and acquire the plurality of third images based on the determined image processing method.

According to an embodiment, the display 430 outputs an image. The display 430 may include the display 11 of FIG. 1. For example, the display 430 may output an image corresponding to video data through a display panel (not illustrated) included therein so that the user can visually recognize the video data.

According to an embodiment, the processor 410 may include various processing circuitry and perform various operations by copying various programs stored in the memory 420 to the RAM and executing the programs. The disclosure has described that the processor 410 includes only one central processing unit (CPU), but may be implemented by a plurality of CPUs (or DSP, SoC, and the like) when implemented.

According to various embodiments, the electronic apparatus 10 may include a plurality of processors. For example, the electronic apparatus 10 may include a general-purpose processor (for example, CPU or application processor), a graphics dedicated processor (for example, GPU), or an SoC chip (for example, processor integrated in an on-device AI Chip).

According to various embodiments, the processor 410 may be implemented by a digital signal processor (DSP), a microprocessor, or a time controller (TCON) that processes a digital signal. However, the processor 410 is not limited thereto, but may include one or more of a central processing unit (CPU), a micro controller unit (MCU), a micro processing unit (MPU), a controller, an application processor (AP), a communication processor (CP), and an ARM processor, or may be defined by these terms. In addition, the processor 410 may be implemented by a system-on-chip (SoC) or a large scale integration (LSI) in which a processing algorithm is embedded, or may be implemented in the form of a field programmable gate array (FPGA).

According to an embodiment, the processor 410 may identify features of at least one object included in the first image, apply the first image to the first neural network to identify features of at least one object included in the acquired second image, determine the image processing method based on the identification results, and acquire the plurality of third images based on the determined image processing method.

According to an embodiment, the communication interface 440 may include various communication circuitry and connect the electronic apparatus 10 to the external apparatus (for example, a server or other electronic apparatuses) under the control of the processor 410. The communication interface 440 may include components implementing various wired or wireless communication methods, such as wireless LAN, Bluetooth, and wired Ethernet, corresponding to the performance and structure of the electronic apparatus 10.

Figure 5:
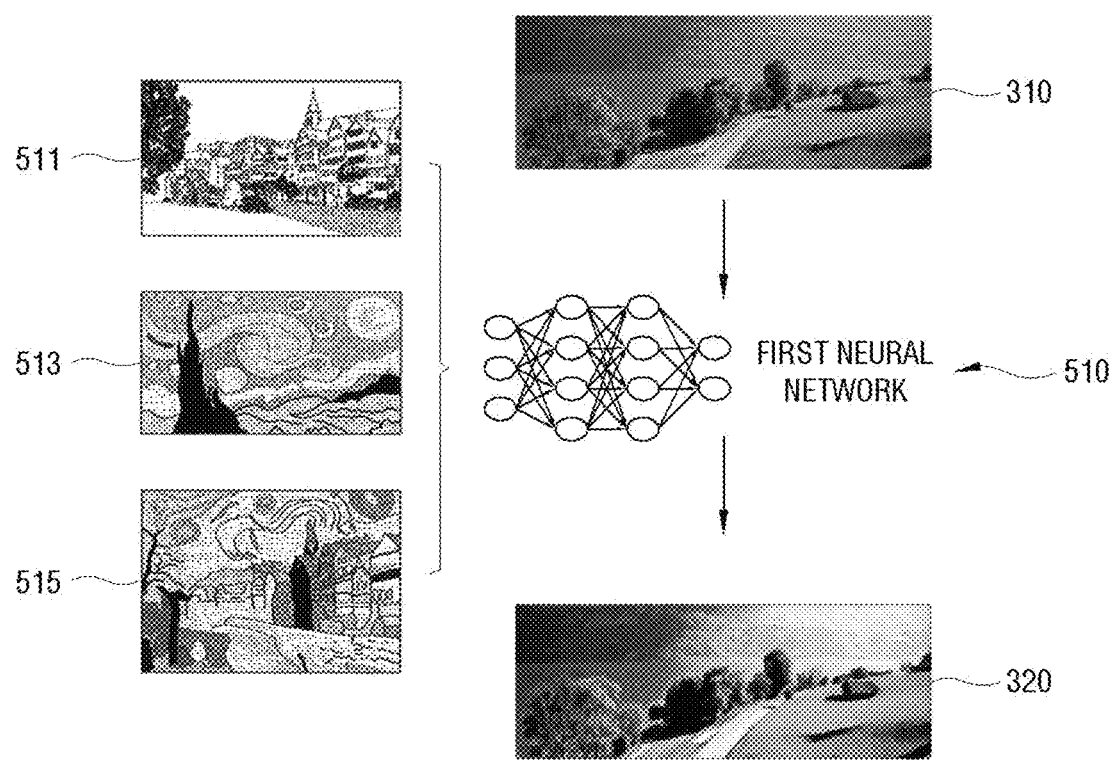
FIG. 5 is a diagram illustrating an example in which the electronic apparatus uses a first image to acquire a second image according to an embodiment
Figure 6:
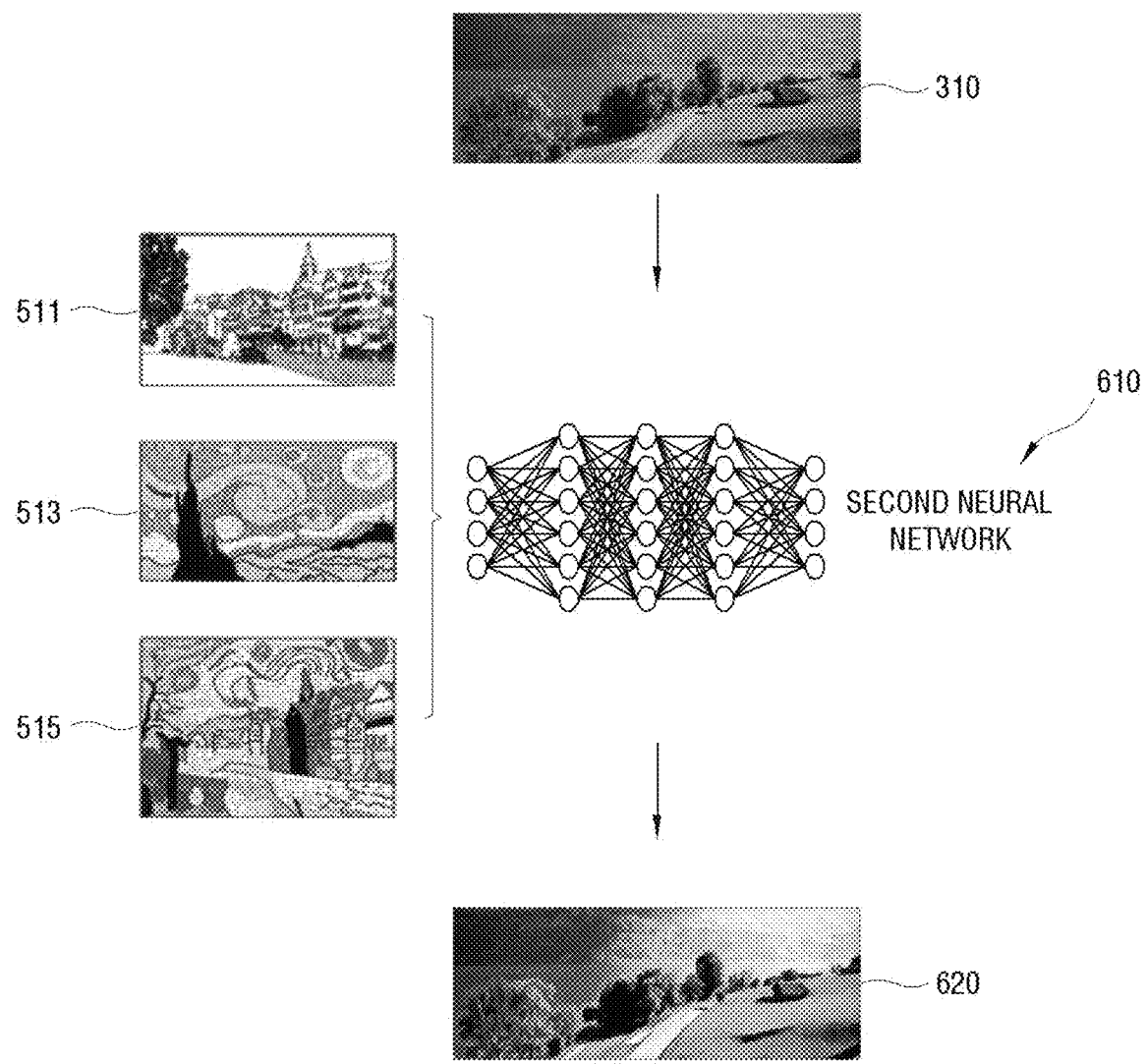
FIG. 6 is a diagram illustrating an example in which the electronic apparatus uses the first image to acquire a fourth image according to an embodiment.

FIG. 5 is a diagram illustrating an example in which the electronic apparatus uses the first image to acquire the second image according to an embodiment, and FIG. 6 is a diagram illustrating an example in which the electronic apparatus uses the first image to acquire the fourth image according to an embodiment.

Referring to FIG. 5, the electronic apparatus 10 may apply the first image 310 to the first neural network 510 to acquire the second image 320. Referring to FIG. 6, the electronic apparatus 10 may apply the first image 310 to the second neural network 610 to acquire the fourth image 620.

Hereinafter, the first neural network and the second neural network will be described in greater detail.

According to an embodiment, the processor 410 of the electronic apparatus 10 may perform the functions of a learning unit and a recognition unit together. The learning unit may include various processing circuitry and/or executable program elements and perform, for example, a function of creating a trained neural network (for example, a first neural network and a second neural network), and the recognition unit may perform a function of recognizing (or inferring, predicting, estimating, and determining) data using the trained neural network.

The learning unit can create or update the neural networks. The learning unit may acquire training data to create the neural network. For example, the learning unit may acquire training data from the memory 420 of the electronic apparatus 10 or the external apparatus.

The training data may be data used to train the neural network. For example, in FIGS. 5 and 6, the learning unit may train the first neural network 510 and the second neural network 610 using, as the training data, an original image 511, an image 513 to be referenced by the original image, and a result image 515 changed by reflecting a style of the image to be referenced an image to be referenced.

Before learning the neural network using the learning data, the learning unit may perform a pre-processing operation on the acquired learning data, or select data to be used for learning from among a plurality of learning data. For example, the learning unit may process or filter the learning data in a predetermined format, or process data in a form suitable for learning by adding/removing noise.

The learning unit may create a neural network configured to acquire the result image by changing the original image to the style of the reference style image using the pre-processed training data.

The trained neural network may include a plurality of neural networks (or layers). Nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

The recognition unit may acquire target data for recognition to acquire the result image by changing the original image to the style of the reference style image. The learning unit may acquire the target data from the memory of the electronic apparatus 10 or the external apparatus.

The target data may include data to be recognized by the neural network.

Before applying to the target data to the trained neural network, the recognition unit may perform the pre-processing operation on the acquired target data, or select data to be used for recognition from among the plurality of target data. For example, the recognition unit may process or filter the target data in a predetermined format, or process data in a form suitable for recognition by adding/removing noise.

The recognition unit applies the pre-processed target data to the first neural network 510 and the second neural network 610 configured to acquire the result image by changing the original image to the style of the reference style image, and thus may acquire values output from the first neural network 510 and the second neural network 610. According to various embodiments, the recognition unit may acquire a probability value (or a reliability value) together with the output value.

Referring to FIG. 5, the electronic apparatus 10 may apply the first image to the first neural network 510 to acquire the second image 320.

As described above, the first neural network 510 may be a neural network trained using, as the training data, the original image 511, the image 513 to be referenced by the original image, and the result image 515 changed by reflecting the style of the image to be referenced.

The electronic apparatus 10 may apply the first image 310 to the first neural network 510 to acquire the second image 320 having the transferred style.

According to an embodiment, the second image 320 acquired by allowing the electronic apparatus 10 to apply the first image 310 to the first neural network 510 may be a low quality image. The low quality may refer for example, to the resolution, sharpness, and the like of the second image 320 not being high. In addition, the time required for the electronic apparatus 10 to acquire the second image 320 by applying the first image 310 to the first neural network 510 may be shorter than the time required to perform the style transfer using another neural network. For example, the time required for the first neural network 510 to acquire the second image 320 using the first image 310 may be within 40 to 60 seconds.

For example, the first neural network 510 may be a neural network having a high image transfer speed and a low-quality result image. For example, the first neural network may be a neural network described in "Perceptual Losses for Real-Time Style Transfer and Super-Resolution, ECCV (European Conference on Computer Vision), 2016".

Referring to FIG. 6, the electronic apparatus 10 may apply the first image to the second neural network 610 to acquire the fourth image 620.

As described above, the second neural network 610 may be a neural network trained using, as the training data, the original image 511, the image 513 to be referenced by the original image, and the result image 515 changed by reflecting the style of the image to be referenced.

The electronic apparatus 10 may apply the first image 310 to the second neural network 610 to acquire the fourth image 620 having the transferred style.

According to an embodiment, the second image 320 acquired by allowing the electronic apparatus 10 to apply the first image 310 to the second neural network 610 may be a higher quality image than the second image 320 described above with reference to FIG. 5. The high quality may refer for example, to the resolution, sharpness, and the like of the fourth image 620 being high. In addition, the time required for the electronic apparatus 10 to acquire the fourth image 620 by applying the first image 310 to the second neural network 610 may be longer than the time required to perform the style transfer using another neural network. For example, the time required for the second neural network 610 to acquire the fourth image 620 using the first image 310 may be within 1 to 3 minutes.

For example, the second neural network 610 may be a neural network having a low image transfer speed but a high quality result image. For example, the second neural network 610 may be based on a method of using CNN described in the thesis "A Neural Algorithm of Artistic Style", and may be a method of reconstructing an object included in a style and an image in a feature map using the feature map which is a layer of the neural network.

Figure 7:
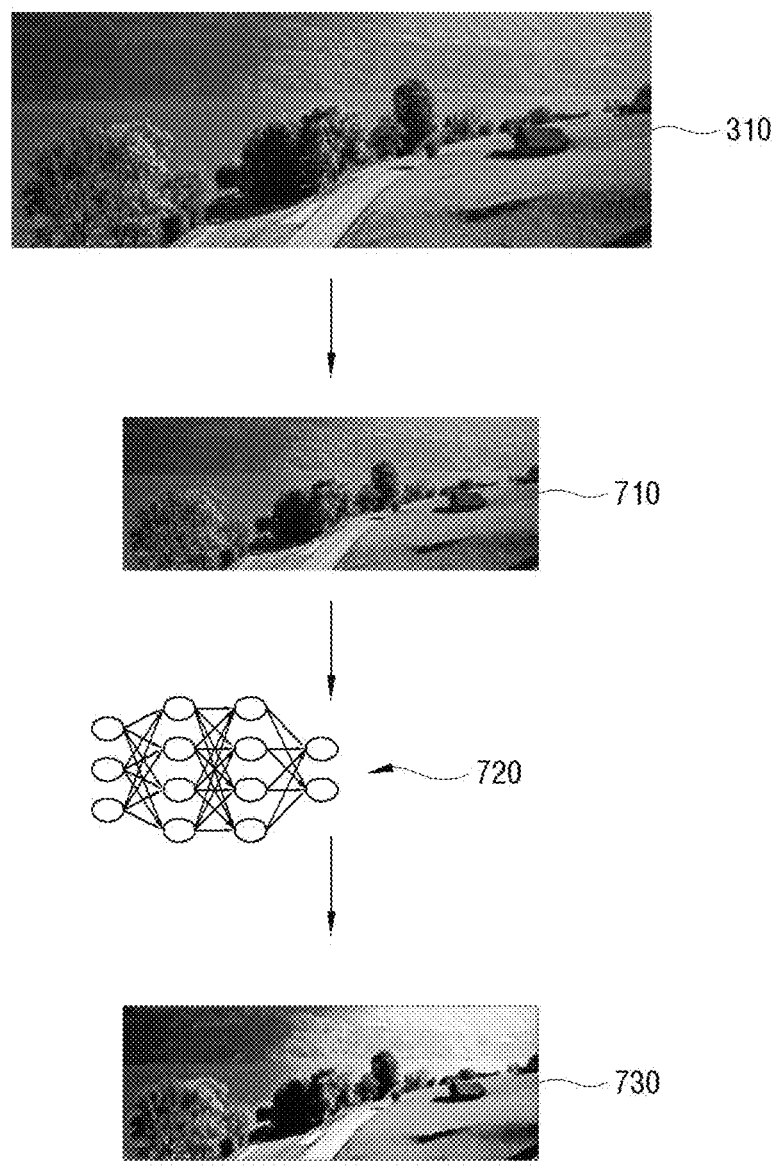
FIG. 7 is a diagram illustrating an example in which the electronic apparatus uses the first image to acquire the second image according to an embodiment.

FIG. 7 is a diagram illustrating an example in which the electronic apparatus uses the first image to acquire the second image according to an embodiment.

Referring to FIG. 7, the electronic apparatus 10 may acquire a low-resolution first image 710 by changing the resolution of the first image 310 applied to the first neural network to be low.

According to an embodiment, the electronic apparatus 10 may apply the low-resolution first image 710 to the neural network 720 configured to acquire the result image by changing the original image to the style of the reference style image to acquire a second image 730.

According to an embodiment, the neural network 720 may be the first neural network 510 described with reference to FIG. 5. The neural network 720 may be the second neural network 610 described with reference to FIG. 6. However, the neural network 720 is not limited thereto.

For example, when the neural network 720 is the first neural network 510, the time required for the electronic apparatus 10 to acquire the second image by applying the low-resolution first image 710 to the neural network 720 may be shorter than 40 to 60 seconds described with reference to FIG. 5.

For example, when the neural network 720 is the second neural network 610, the time required for the electronic apparatus 10 to acquire the second image by applying the low-resolution first image 710 to the neural network 720 may be shorter than the time described with reference to FIG. 6.

Figure 8:
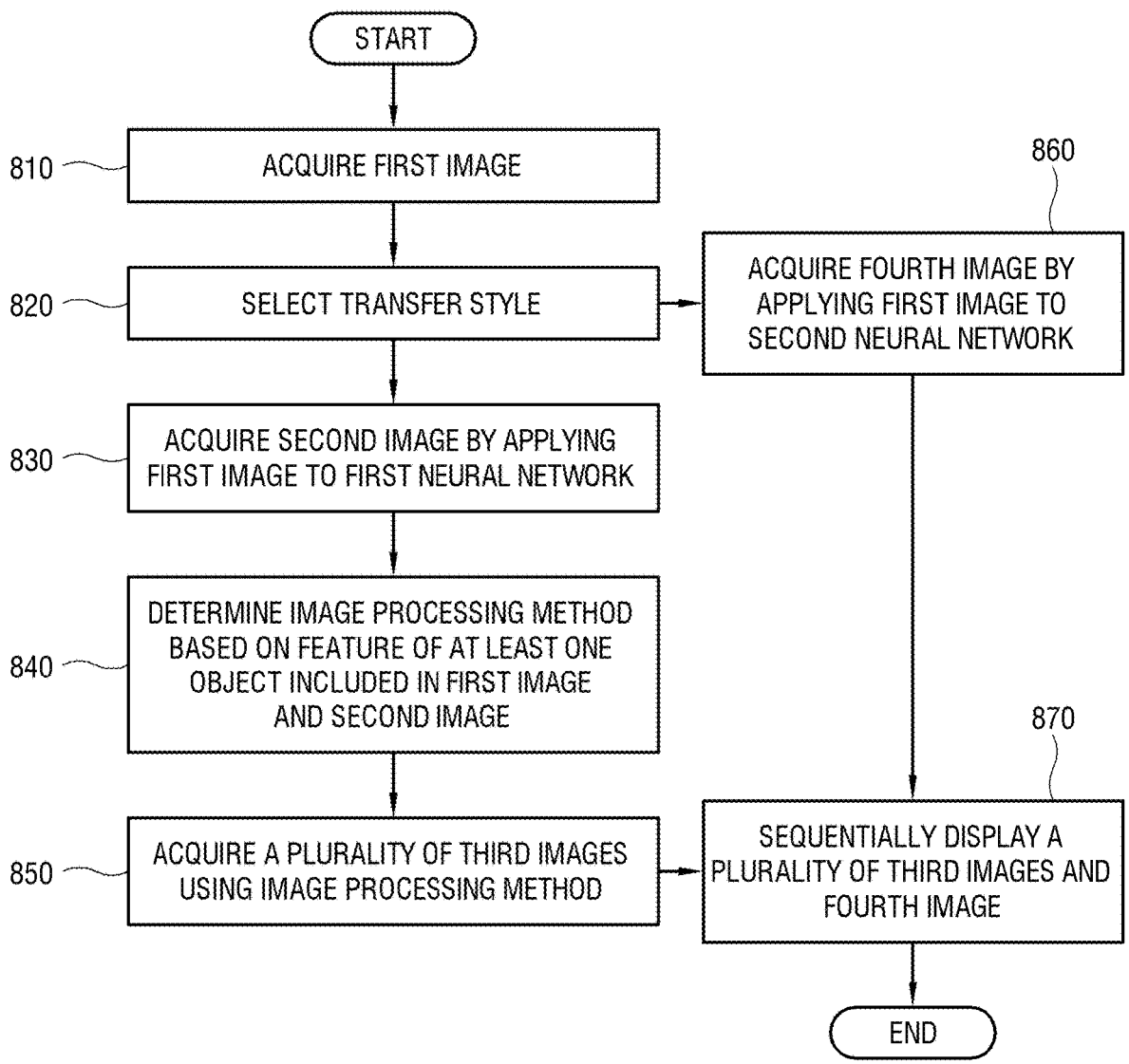
FIG. 8 is a flowchart illustrating an example method in which the electronic apparatus displays the plurality of images acquired using the first image according to an embodiment.
Figure 9:
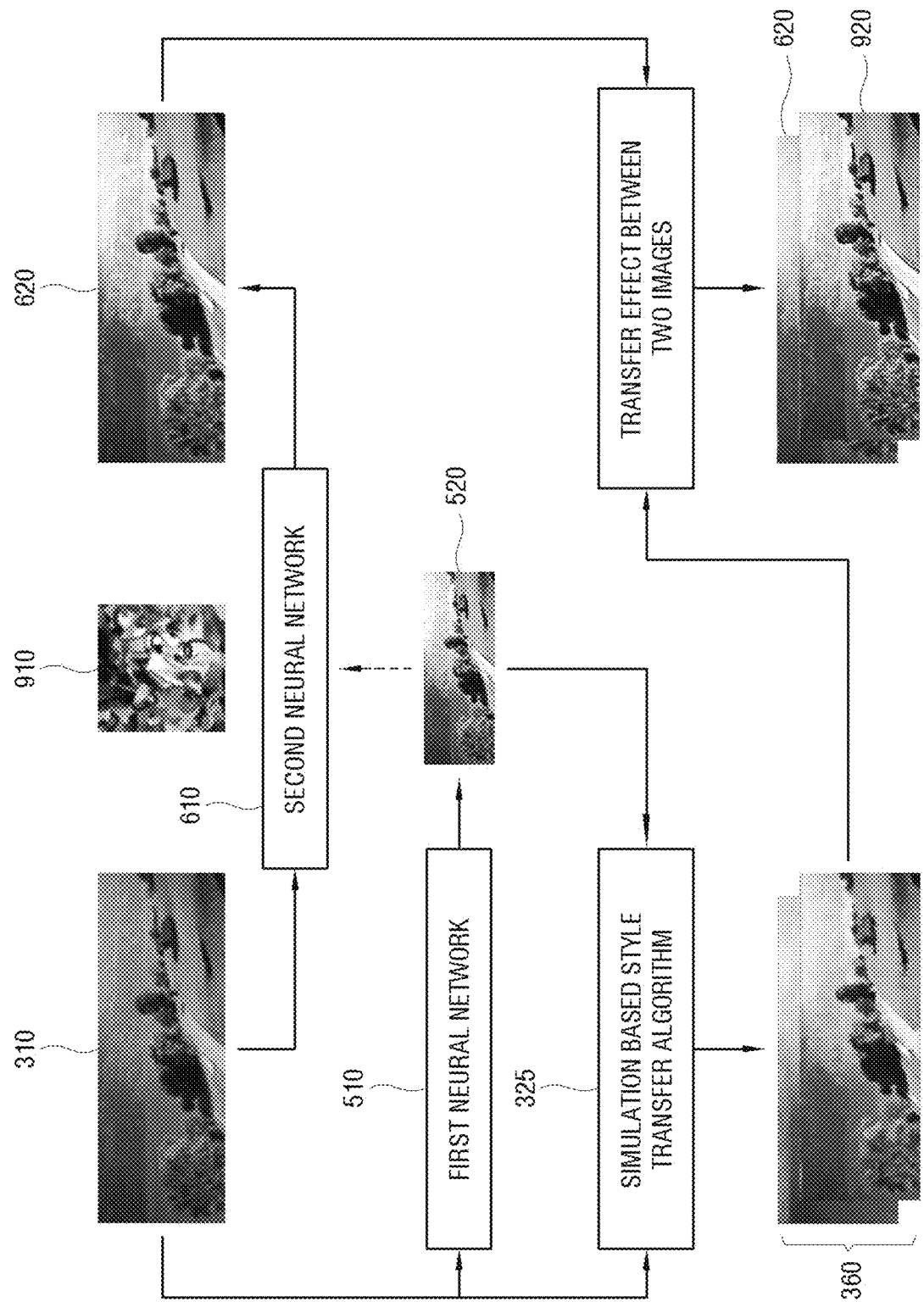
FIG. 9 is a block diagram illustrating an example in which the electronic apparatus displays the plurality of images acquired using the first image according to an embodiment.

FIG. 8 is a flowchart illustrating an example in which the electronic apparatus displays the plurality of images acquired using the first image according to an embodiment, and FIG. 9 is a block diagram illustrating an example in which the electronic apparatus displays the plurality of images acquired using the first image according to an embodiment.

According to an embodiment, the electronic apparatus 10 may use the first image to acquire and display the second image, the third image, and the fourth image.

Referring to operation 810 of FIG. 8, the electronic apparatus 10 may acquire the first image. Referring to operation 820, the electronic apparatus 10 may select the transfer style.

According to an embodiment, the electronic apparatus 10 may provide a user interface guiding selection of the first image and the transfer style for an ambient function. A user may select the first image and the transfer style using the user interface.

For example, referring to FIG. 9, the user may select the first image 310 and a transfer style 910 displayed on the display.

According to an embodiment, when the first image 310 and the transfer style image 910 are selected, the electronic apparatus 10 may simultaneously or sequentially perform the process of acquiring the second image and the process of acquiring the fourth image.

Referring to operation 830 of FIG. 8, the electronic apparatus 10 may apply the first image to the first neural network to acquire the second image. The first neural network may be a neural network trained using, as the training data, the original image, the image to be referenced by the original image, and the result image changed by reflecting the style of the image to be referenced.

Referring to FIG. 9, the electronic apparatus 10 may apply the first image 310 to the first neural network 510 to acquire the second image 520 having the transferred style. The first neural network 510 may be a neural network having a high image transfer speed and a low quality result image. According to various embodiments, the electronic apparatus 10 may change the resolution of the first image 310 to be low and then apply the first image 310 to the first neural network 510 to acquire the second image 520 having the transferred style. As a result, the electronic apparatus 10 may acquire the second image 520 faster.

Referring to operation 840 of FIG. 8, the electronic apparatus 10 may determine an image processing method based on features of at least one object included in the first image and the second image.

According to an embodiment, the electronic apparatus 10 may analyze the shapes, colors, or textures of at least one object identified in the first image 310 and the second image 520, respectively. For example, the electronic apparatus 10 may identify the shape of the object in the first image 510 and identify the color of the object in the second image 520. In addition, the electronic apparatus 10 may acquire the texture of the object using the second image 520, and identify the texture of the object in the first image 310 in a high frequency region.

The electronic apparatus 10 may determine at least one of the shapes, textures, or colors that are to be applied to the objects included in the image to be created or one area of the image by applying at least one of the shapes, textures, or colors of at least one object identified using the first image 310 and the second image 520 to the simulation based style transfer 325.

For example, the electronic apparatus 10 may determine the image processing method including the brush effect such as creating objects while adding points, faces, or lines having various sizes to images without objects using a paint brush (or brush) based on the information on the identified shapes, textures, or colors.

Referring to operation 850, the electronic apparatus 10 may acquire the plurality of third images based on the image processing method.

According to an embodiment, the electronic apparatus 10 may determine the size, type, color, and the like of the brush to be used for the brush effect based on the determined image processing method, and then acquire the plurality of third images.

Referring to FIG. 9, the electronic apparatus 10 may acquire the plurality of third images 360.

Referring to operation 860, the electronic apparatus 10 may apply the first image to the second neural network to acquire the fourth image. The second neural network may be a neural network trained using, as the training data, the original image, the image to be referenced by the original image, and the result image changed by reflecting the style of the image to be referenced.

Referring to FIG. 9, the electronic apparatus 10 may apply the first image 310 to the second neural network 610 to acquire the fourth image 620 having the transferred style. The second neural network 610 may be a neural network having a low image transfer speed but a high quality result image.

According to an embodiment, the electronic apparatus 10 may adjust the number of third images based on the time required for the second neural network 610 to acquire the fourth image 620. For example, when it is identified that it takes 1 minute for the second neural network 610 to acquire the fourth image 620, the electronic apparatus 10 may create a third image of 3600 sheets and display a third image of 60 sheets per second on the display. However, the disclosure is not limited thereto. For example, the electronic apparatus may create a third image of 1800 sheets and display a third image of 30 sheets per second on the display. As described above, the electronic apparatus 10 may adjust the number of third images to be created or the display time of the created third images, based on the time required to create the fourth image.

According to various embodiments, the electronic apparatus 10 may apply the second image to the second neural network 610 to be able to refer to the second image 520 in the process of creating, by the second neural network 610, the fourth image 620 using the first image 310.

According to various embodiments, the electronic apparatus 10 may apply to the simulation based style transfer algorithm 325 an intermediate product (for example, an image similar to the fourth image 620) acquired while the second neural network 610 creates the fourth image 620, thereby increasing the similarity between the plurality of third images 360 and the fourth image 620 acquired by the simulation based style transfer algorithm.

Referring to operation 870 of FIG. 8, the electronic apparatus 10 may sequentially display the plurality of third images and the fourth image. As a result, the user may check the process of changing the first image 310 to the changed fourth image 620 with reference to the reference style image.

Referring to FIG. 9, the electronic apparatus 10 may apply a transfer effect as image processing to increase similarity between a last acquired third image 920 (or third image to be displayed last among the plurality of third images) among the plurality of third images 360 and the fourth image 620 to the last acquired third image 920. For example, the electronic apparatus 10 may apply the alpha blending technique to the last acquired third image 920.

Figure 10:
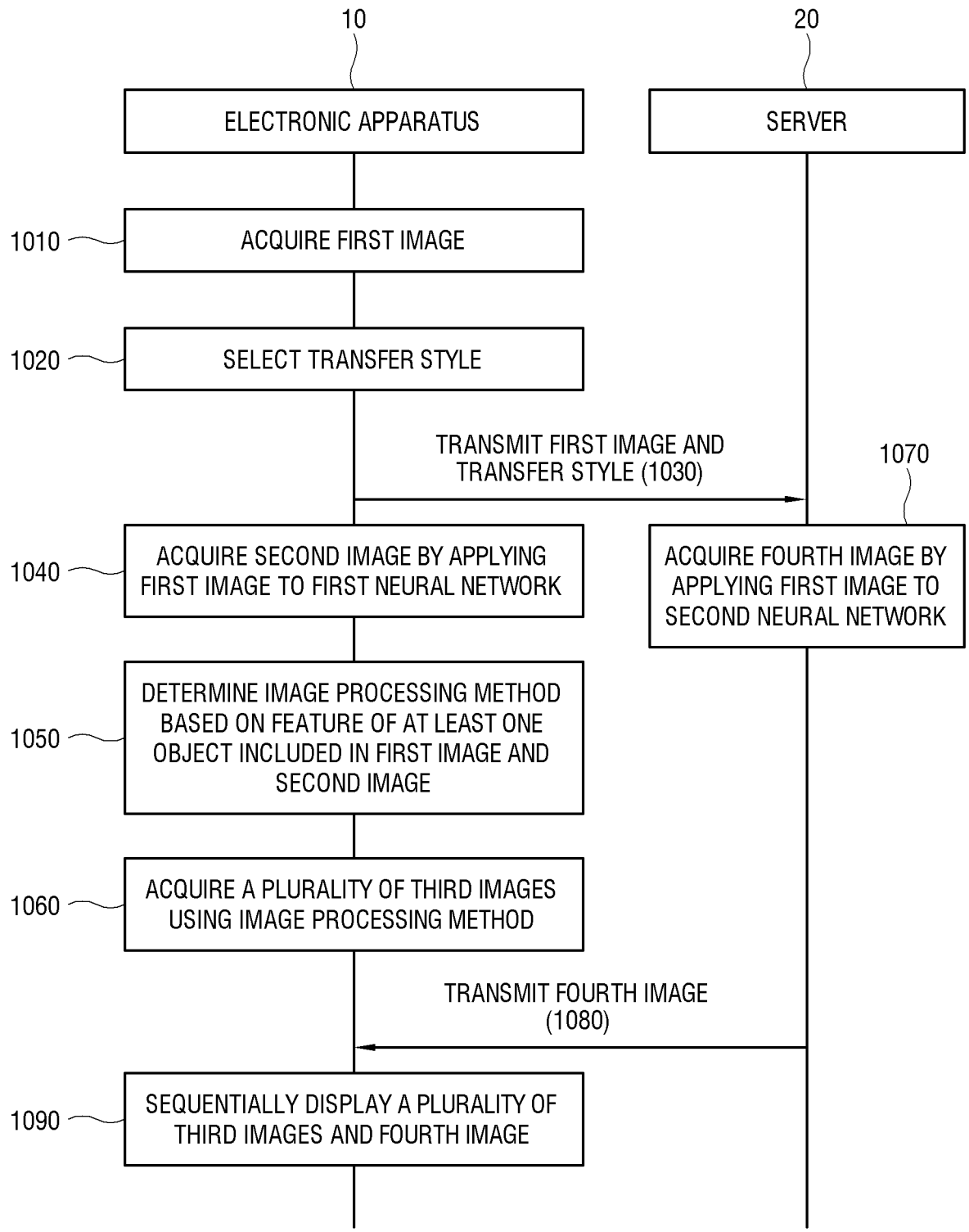
FIG. 10 is a signal flow diagram illustrating an example method of operating the electronic apparatus linked to a server to display the plurality of images acquired using the first image according to an embodiment.

FIG. 10 is a signal flow diagram illustrating an example in which the electronic apparatus is linked to a server to display the plurality of images acquired using the first image according to an embodiment.

According to an embodiment, the electronic apparatus 10 may perform the simulation based style transfer, and the external apparatus (for example, server 20) may perform a process of acquiring a final image (for example, fourth image) using the second neural network.

Referring to operation 1010, the electronic apparatus 10 may acquire the first image. Referring to operation 1020, the electronic apparatus 10 may select the transfer style.

Referring to operation 1030, the electronic apparatus 10 may transmit the first image and the transfer style to the server 20.

Referring to operation 1040, the electronic apparatus 10 may apply the first image to the first neural network to acquire the second image.

Referring to operation 1050, the electronic apparatus 10 may determine the image processing method based on features of at least one object included in the first image and the second image.

Referring to operation 1060, the electronic apparatus 10 may acquire the plurality of third images using the image processing method.

According to an embodiment, the electronic apparatus 10 may adjust the number of third images based on the time required for the server 20 to acquire the fourth image 620 using the second neural network. For example, when it is estimated based on the resolution of the first image that it takes 1 minute for the server 20 to acquire the fourth image using the second neural network, the electronic apparatus 10 may create a third image of 3600 sheets and display a third image of 60 sheets per second on the display. However, the disclosure is not limited thereto. For example, the electronic apparatus may create a third image of 1800 sheets and display a third image of 30 sheets per second on the display. As described above, the electronic apparatus 10 may adjust the number of third images to be created or the display time of the created third images, based on the time required to create the fourth image.

According to various embodiments, the electronic apparatus 10 may receive the time required to acquire the fourth image calculated by the server 20. The electronic apparatus 10 may adjust the number of third images to be created based on the required time received.

Referring to operation 1070, the server 20 may apply the first image to the second neural network to acquire the fourth image.

Referring to operation 1080, the server 20 may transmit the fourth image to the electronic apparatus 10.

Referring to operation 1090, the electronic apparatus 10 may sequentially display the plurality of third images and the fourth image.

Figure 11:
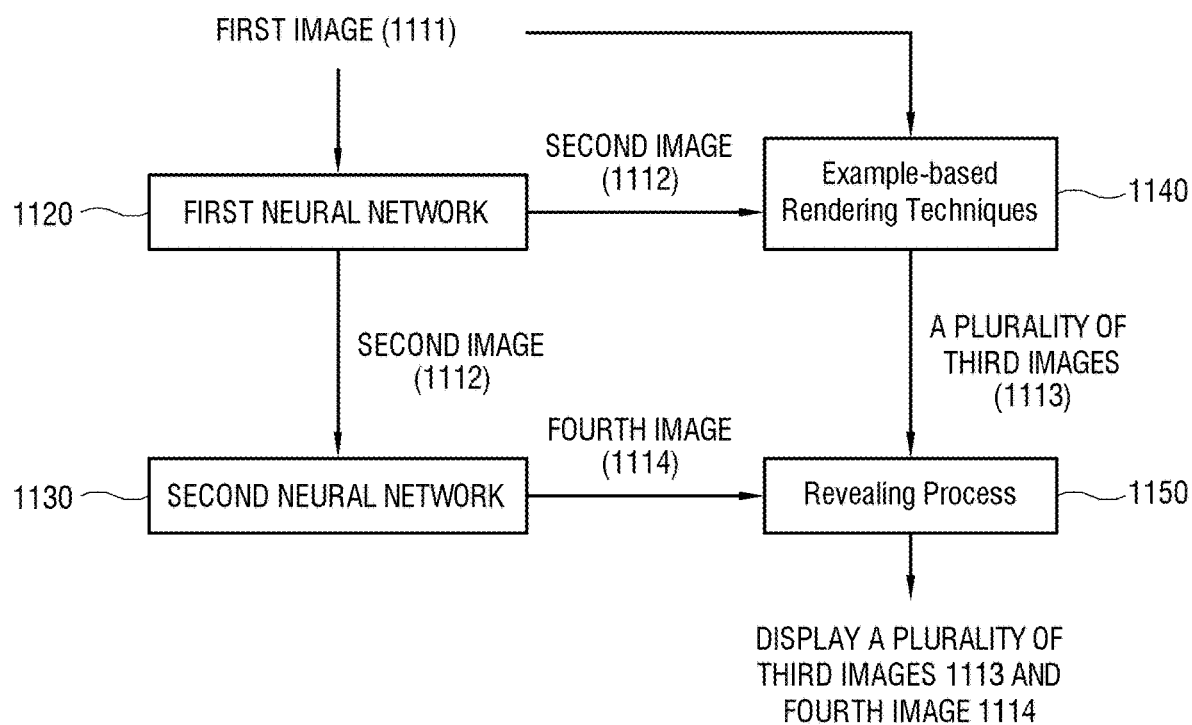
FIG. 11 is a block diagram illustrating an example process of creating, by the electronic apparatus, a third image according to an embodiment.

FIG. 11 is a block diagram illustrating an example process of creating, by the electronic apparatus, a third image according to a embodiment.

Referring to FIG. 11, when a first image 1111 and a style to be referenced to transfer the first image 1111 are selected, the electronic apparatus 10 may apply the first image 1111 to a first neural network 1120 to acquire a second image 1112. The first neural network 1120 may be a neural network configured to acquire a result image by changing an original image to a style of a reference style image.

The electronic apparatus 10 may apply the first image 1111 and the second image 1112 to the simulation based style transfer to acquire a plurality of third images. For example, the electronic apparatus 10 may apply the first image 1111 and the second image 1112 to an example-based rendering techniques algorithm 1140 to acquire a plurality of third images 1113. The example-based rendering techniques algorithm 1140 may refer, for example, to a method of acquiring a plurality of third images by creating a shape while adding points, lines, or faces including colors or textures acquired as, for example, a result of analysis of the first image 1111 and the second image 1112 to an image having no an object as a whole.

According to an embodiment, the electronic apparatus 10 may perform additional image processing on a last acquired third image among the plurality of third images 1113. For example, the electronic apparatus 10 may perform additional image processing so that the shapes, colors, or textures of the objects included in the last acquired third image among the plurality of third images 1113 are similar to shapes, colors, or textures of objects included in a fourth image 1114. The electronic apparatus 10 may use, for example, a revealing process 1150 to adjust the shapes, colors, or textures of the objects included in the last acquired third image to be similar to the shapes, colors, or textures of the objects included in the fourth image 1114.

According to an embodiment, the electronic apparatus 10 may apply the first image 1111 to a second neural network 1130 to acquire the fourth image 1114. The second neural network 1130 may be a neural network configured to acquire a result image by changing an original image to a style of a reference style image.

According to various embodiments, the electronic apparatus 10 may increase similarity between the fourth image 1114 acquired using the second image 1112 and the third image 1113 acquired using the second image 1112 while acquiring the fourth image 1114 by applying the first image 1111 to the second neural network 1130.

According to an embodiment, the electronic apparatus 10 may sequentially display the plurality of acquired third images 1113 including the third image to which the above-described image processing is applied and the fourth image 1114.

Figure 12:
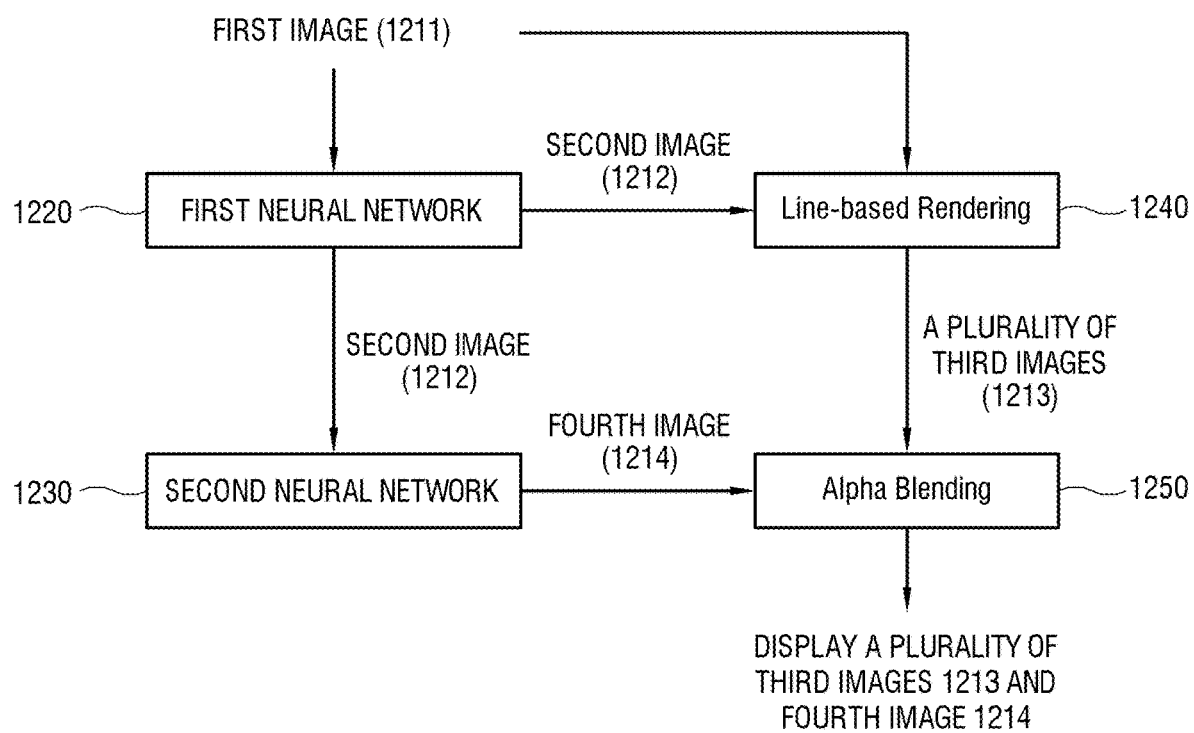
FIG. 12 is a block diagram illustrating an example process of creating, by the electronic apparatus, the third image according to various embodiments.

FIG. 12 is a block diagram illustrating an example process of creating, by the electronic apparatus, the third image according to various embodiments.

Referring to FIG. 12, when a first image 1211 and a style to be referenced to transfer the first image 1211 are selected, the electronic apparatus 10 may apply the first image 1211 to a first neural network 1220 to acquire a second image 1212. The first neural network 1220 may be a neural network configured to acquire a result image by changing an original image to a style of a reference style image. The electronic apparatus 10 may apply the first image 1211 and the second image 1212 to the simulation based style transfer to acquire a plurality of third images. For example, the electronic apparatus 10 may apply the first image 1211 and the second image 1212 to a line-based rendering algorithm 1240 to acquire a plurality of third images. The line-based rendering algorithm 1240 may express a shape of an object while applying various lines reflecting a thickness, a direction, color, or texture corresponding to a shape acquired as, for example, a result of analysis of the first image 1211 and the second image 1212 to one area of an image having no an object. The line-based rendering algorithm 1240 may acquire a plurality of third images by adding color after the expression of the shape of the object is completed to a certain level.

According to an embodiment, the electronic apparatus 10 may perform additional image processing so that the shapes, colors, or textures of the objects included in the last acquired third image among the plurality of third images 1213 are similar to shapes, colors, or textures of objects included in a fourth image 1214. The electronic apparatus 10 may use, for example, alpha blending 1250 to adjust the shapes, colors, or textures of the objects included in the last acquired third image among the plurality of third images 1213 to be similar to the shapes, colors, or textures of the objects included in the fourth image 1214.

According to an embodiment, the electronic apparatus 10 may apply the first image 1211 to a second neural network 1230 to acquire the fourth image 1214. The second neural network 1230 may be a neural network configured to acquire a result image by changing an original image to a style of a reference style image.

According to various embodiments, the electronic apparatus 10 may increase similarity between the fourth image 1214 acquired using the second image 1212 and the third image 1213 acquired using the second image 1212 while acquiring the fourth image 1214 by applying the first image 1213 to the second neural network 1230.

According to an embodiment, the electronic apparatus 10 may sequentially display the plurality of acquired third images including the third image to which the above-described image processing is applied and the fourth image.

Figure 13:
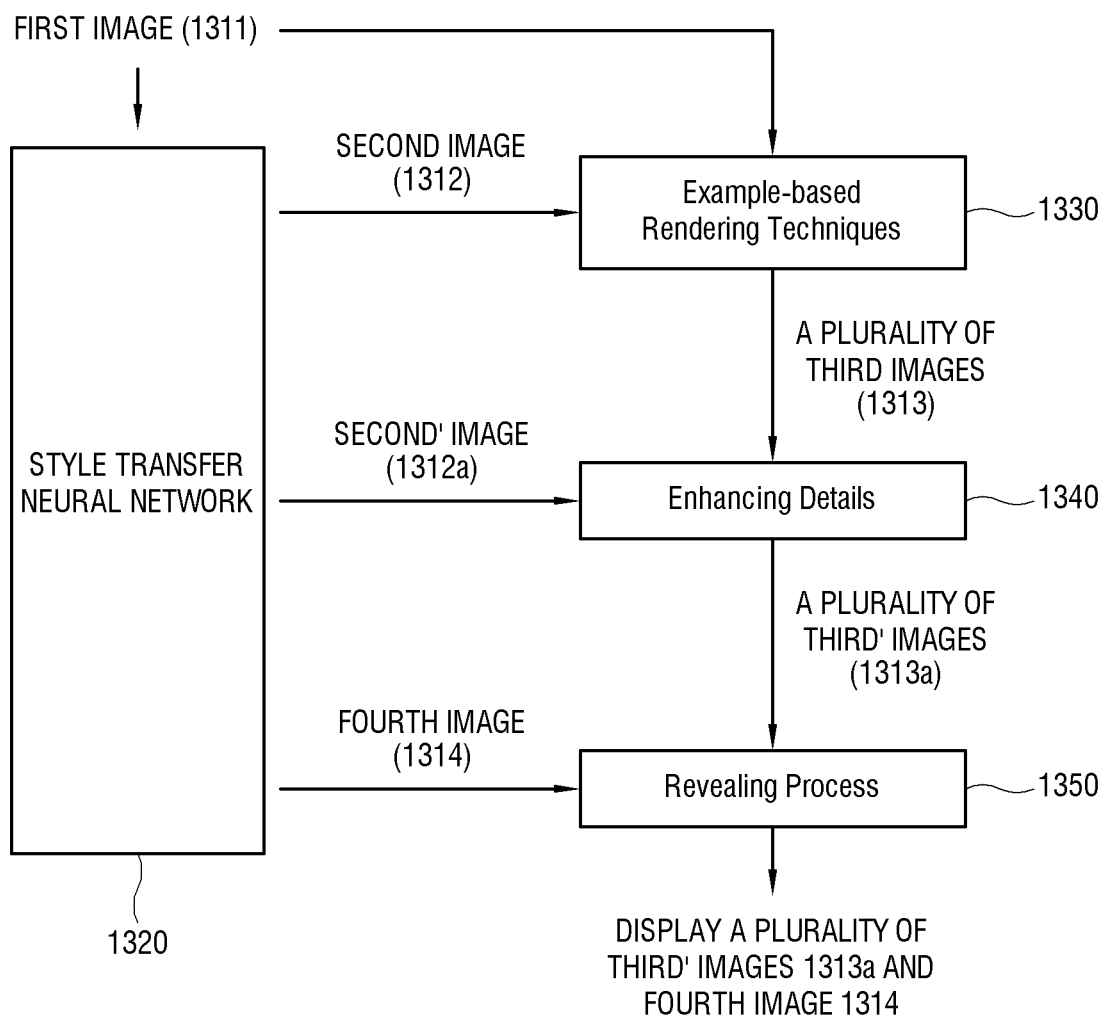
FIG. 13 is a block diagram illustrating an example process of creating, by the electronic apparatus, the third image according to various embodiments.

FIG. 13 is a block diagram illustrating an example process of creating, by the electronic apparatus, the third image according to various embodiments.

Referring to FIG. 13, when a first image 1311 and a style to be referenced to transfer the first image 1311 are selected, the electronic apparatus 10 may apply the first image 1311 to a first neural network 1320 to acquire a second image 1312, a second' image 1312a, and a fourth image 1314. The electronic apparatus 10 may change, for example, the resolution of the first image 1311 to acquire the second image 1312, the second' image 1312a, and the fourth image 1314. The style transfer neural network 1320 may be a neural network configured to acquire a result image by changing an original image to a style of a reference style image.

For example, when the resolution of the first image 1311 is 3840*2160, the electronic apparatus 10 may change the resolution of the first image 1311 to 1280*720, and then apply the first image 1311 to the style transfer neural network, thereby acquiring the second image 1312. The electronic apparatus 10 may change the resolution of the first image 1311 to 1920*1080 and then applying the first image 1311 to the style transfer neural network 1320, thereby acquiring the second' image 1312a.

According to an embodiment, the electronic apparatus 10 may apply the first image 1311 and a second image 1312 to the simulation based style transfer to acquire the plurality of third images. For example, the electronic apparatus 10 may apply the first image 1311 and the second image 1312 to an example-based rendering techniques algorithm 1330 to acquire the plurality of third images 1313. The example-based rendering techniques algorithm 1330 may refer, for example, to a method of acquiring the plurality of third images 1313 by creating a shape while adding points, lines, or faces including colors or textures acquired by, for example, an analysis result of the first image 1311 and the second image 1312 to an image having no an object as a whole.

According to an embodiment, the electronic apparatus 10 may apply the first image 1311 to the second neural network 1320 to acquire the fourth image 1314. In this case, the electronic apparatus 10 may maintain the original resolution of the first image 1311 to acquire the fourth image 1314. Accordingly, the fourth image 1314 may be an image having a higher resolution than the second image 1312 or the second' image 1312a described above.

According to an embodiment, the electronic apparatus 10 may apply the second' image 1312a and the plurality of third images 1313 to an enhancing details algorithm 1340 to acquire a plurality of third' images 1313a corrected so that at least one of the colors, shapes, or textures of the objects included in the plurality of third images 1313 is similar to at least one of the colors, shapes, or textures of the objects included in the fourth image 1314. That is, the electronic apparatus 10 may use the second' image 1312a having a higher resolution than the second image 1312 to acquire the plurality of third' images 1313a in which at least one of the colors, shapes, or textures of the objects included in the plurality of third images 1313 is more similar to at least one of the colors, shapes, or textures of the objects included in the fourth image 1314.

According to an embodiment, the electronic apparatus 10 may perform additional image processing on the last acquired third' image among the plurality of third' images 1313a. For example, the electronic apparatus 10 may perform additional image processing so that the shapes, colors, or textures of the objects included in the last acquired third' image among the plurality of third' images 1313a are similar to shapes, colors, or textures of objects included in the fourth image 1114. The electronic apparatus 10 may use, for example, a revealing process 1350 to adjust the shapes, colors, or textures of the objects included in the last acquired third' image to be similar to the shapes, colors, or textures of the objects included in the fourth image 1314.

According to an embodiment, the electronic apparatus 10 may sequentially display the plurality of acquired third' images including the third' image to which the above-described image processing is applied and the fourth image.

Figure 14:
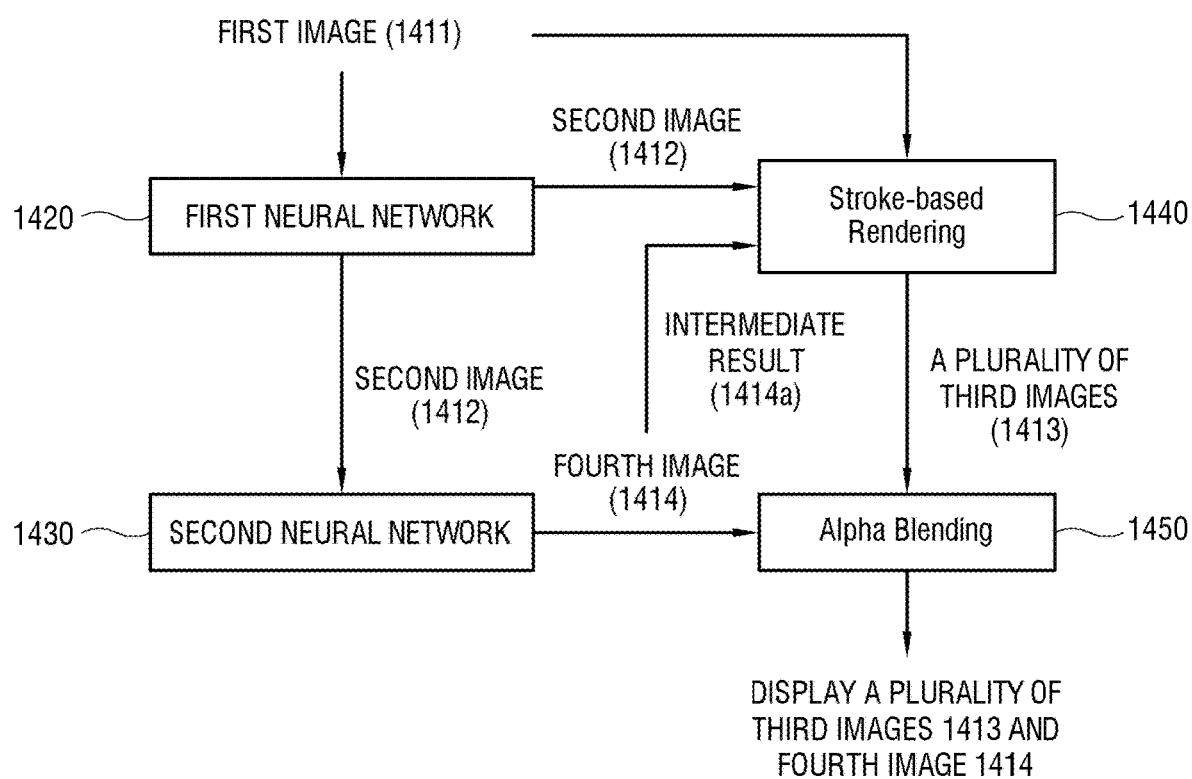
FIG. 14 is a block diagram illustrating an example process of creating, by the electronic apparatus, the third image according to various embodiments.

FIG. 14 is a block diagram illustrating an example process of creating, by the electronic apparatus, the third image according to various embodiments.

Referring to FIG. 14, when a first image 1411 and a style to be referenced to transfer the first image 1411 are selected, the electronic apparatus 10 may apply the first image 1411 to a first neural network 1420 to acquire a second image 1412. The first neural network 1420 may be a neural network configured to acquire a result image by changing an original image to a style of a reference style image.

The electronic apparatus 10 may apply the first image 1411 and a second image 1412 to the simulation based style transfer to acquire a plurality of third images. For example, the electronic apparatus 10 may apply the first image 1411 and the second image 1412 to a stroke-based rendering algorithm 1440 to acquire a plurality of third images 1413. The stroke-based rendering algorithm 1440 may express a shape of an object while applying various lines reflecting a thickness, a direction, color, or texture corresponding to a shape acquired as, for example, an analysis result of the first image 1411 and the second image 1412 to one area of an image having no an object. The stroke-based rendering algorithm 1440 may complete a shape of an object while adding colors in an order from a high frequency region to a low frequency region.

According to an embodiment, the electronic apparatus 10 may apply to the stroke-based rendering algorithm 1440 an intermediate result 1414a acquired while the second neural network 1430 uses the first image 1411 to acquire a fourth image 1414. As a result, the electronic apparatus 10 may acquire the plurality of third images 1413 including an object having high similarity to the shapes, colors, or textures of the objects included in the fourth image 1414.

According to an embodiment, the electronic apparatus 10 may perform additional image processing so that the shapes, colors, or textures of the objects included in the last acquired third image among the plurality of third images 1413 are similar to shapes, colors, or textures of objects included in a fourth image. The electronic apparatus 10 may use, for example, alpha blending 1450 to adjust the shapes, colors, or textures of the objects included in the last acquired third image among the plurality of third images 1413 to be similar to the shapes, colors, or textures of the objects included in the fourth image.

According to various embodiments, the electronic apparatus 10 may increase similarity between the fourth image 1414 acquired using the second image 1412 and the third image 1413 acquired using the second image 1412 while acquiring the fourth image by applying the first image 1411 to the second neural network 1430.

According to an embodiment, the electronic apparatus 10 may sequentially display the plurality of acquired third images including the third image to which the above-described image processing is applied and the fourth image.

Figure 15:
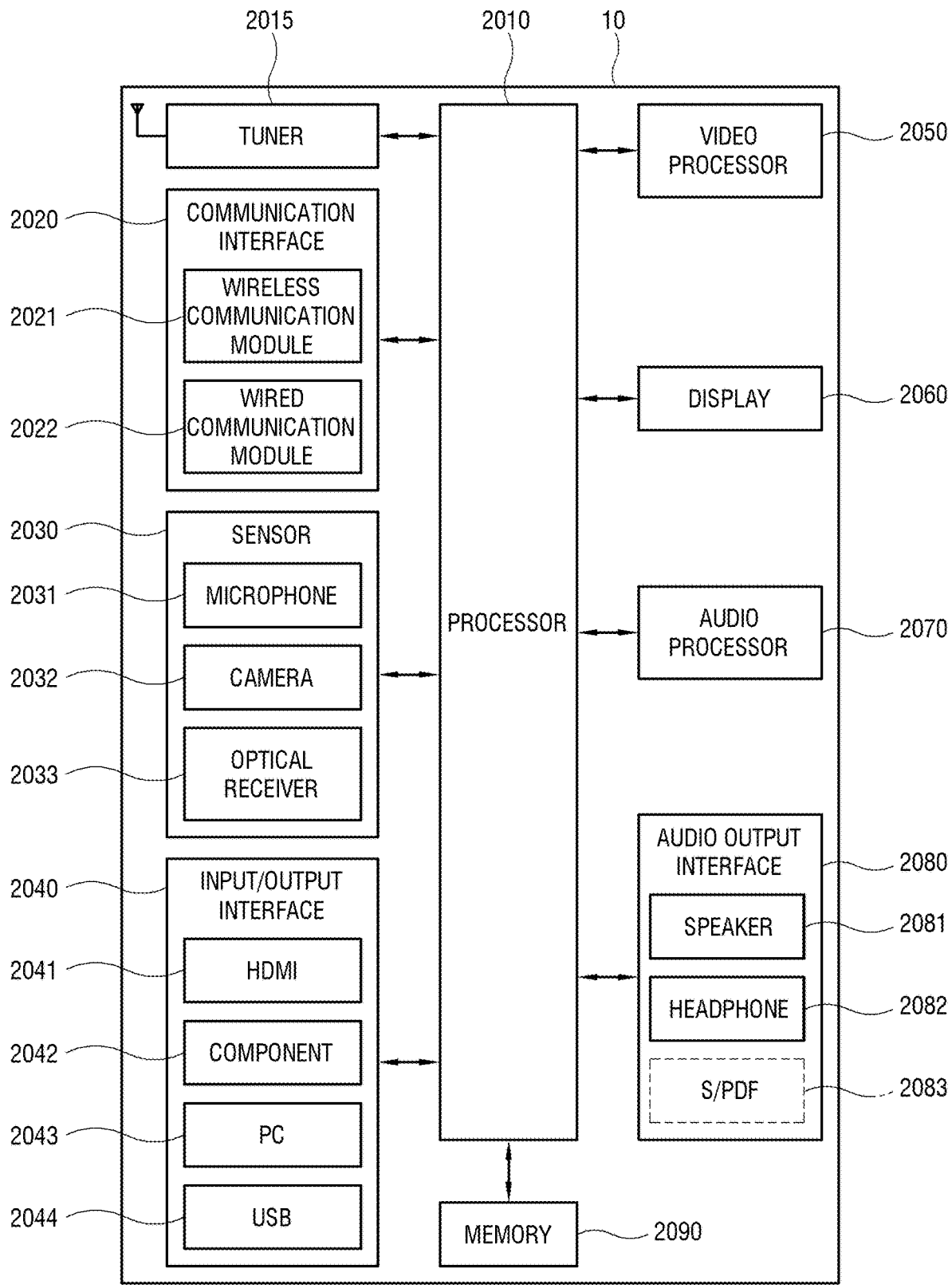
FIG. 15 is a block diagram illustrating an example electronic apparatus according to various embodiments.

FIG. 15 is a block diagram illustrating an example electronic apparatus according to various embodiments.

As illustrated in FIG. 15, the electronic apparatus 10 may further include at least one of a memory 2090, a tuner 2015, a sensor 2030, an input/output interface (e.g., including input/output circuitry) 2040, a video processor (e.g., including video processing circuitry) 2050, an audio processor (e.g., including audio processing circuitry) 2070, and an audio output interface (e.g., including audio output circuitry) 2080, in addition to a processor (e.g., including processing circuitry) 2010, a communication interface (e.g., including communication circuitry) 2020, and display 2060.

The processor 2010 may include various processing circuitry and execute, for example, software (for example, program) stored in the memory 2090 to control at least one other component (for example, hardware or software component) of the electronic apparatus 10 connected to the processor 2010 and perform various data processing or operations. According to an embodiment, as at least a part of data processing or operations, the processor 2010 may load an instruction or data received from other components into the memory (for example, volatile memory) 2090, process the command or data stored in the memory 2090, and store the result data in the memory (for example, nonvolatile memory). According to an embodiment, the processor 2010 may include a main processor (for example, a central processing unit or an application processor), and a coprocessor (for example, a graphics processing unit, an image signal processor, a sensor hub processor, or a communication processor) that can be operated separately therefrom or therewith. Additionally or alternatively, the coprocessor may be configured to use lower power than the main processor, or to be specialized for a designated function. The coprocessor can be implemented independent of the main processor or as a part thereof. The coprocessor may control at least some of the functions or states associated with at least one of the components of the electronic apparatus 10 together with the main processor instead of the main processor while the main processor is in an inactive (for example, sleep) state or while the main processor is in an active (for example, execution of applications) state.

The communication interface 2020 may include various communication circuitry and connect the electronic apparatus 10 to an external apparatus under the control of the processor 2010. The communication interface 2020 operates independent of the processor 2010 (for example, an application processor) and may include one or more communication processors supporting direct (for example, wired) communication or wireless communication. According to an embodiment, the communication interface 2020 may include a wireless communication module 2021 (for example, a cellular communication module, a short-range wireless communication module, or a global navigation satellite system (GNSS) communication module) or a wired communication module 2022 (for example, a local area network (LAN) communication module or a power line communication module). Among these communication modules, the corresponding communication module may communicate with the server 20 through a first network (for example, a short-range communication network such as Bluetooth, WiFi direct, or infrared data association (IrDA)) or a second network (for example, a long-range communication network such as a cellular network, the Internet, or a computer network (for example, LAN or WAN)). These various types of communication modules may be integrated into one component (for example, a single chip), or may be implemented as a plurality of separate components (for example, multiple chips).

The display 2060 may visually provide information (for example, UI, and the like) to the outside (for example, a user) of the electronic apparatus 10. When the display 2060 and a touch pad are formed in a layer structure to configure a touch screen, the display 2060 may be used as an input device in addition to an output device. The display 2060 may include any one of a liquid crystal display, a thin film transistor-liquid crystal display, an organic light-emitting diode, a flexible display, a 3D display, and an electrophoretic display. In addition, depending on the implementation form of the electronic apparatus 10, the electronic apparatus 10 may include two or more displays 2060.

The tuner 2015 may tune and select only a frequency of a channel that is intended to be received by the electronic apparatus 10 among many radio wave components through amplification, mixing, resonance, or the like, of broadcasting signals received in a wired or wireless manner. The broadcasting signals include audio, video, and additional information (for example, an electronic program guide (EPG)).

The broadcast signal received through the tuner 2015 is decoded (for example, audio decoding, video decoding, or additional information decoding) to be separated into the audio, video, and/or additional information. The separated audio, video, and/or additional information may be stored in the memory 2090 under the control of the processor 2010. The tuner 2015 of the electronic apparatus 10 may be one or plural. The tuner 2015 may be implemented as an all-in-one with the electronic apparatus 10 or may be implemented as a separate device having a tuner electrically connected to the electronic apparatus 10 and a tuner (not illustrated) connected to the input/output interface 2040.

The sensor 2030 detects a user's voice, a user's image, or a user's interaction, and may include a microphone 2031, a camera 2032, and an optical receiver 2033.

The microphone 2031 may receive an uttered speech of a user. The microphone 2031 may convert the received speech into an electrical signal and output the electrical signal to the processor 2010. The camera 2032 may receive an image (for example, a continuous frame) corresponding to a user's motion including a gesture in a camera recognition range. The optical receiver 2033 receives an optical signal (including a control signal) received from an external control device (for example, a remote control). The optical receiver 2033 may receive an optical signal corresponding to a user input (for example, a touch, a push, a touch gesture, a voice, or a motion) from the control device. The control signal may be extracted from the received optical signal under control of the processor 2010.

The input/output interface 2040 may include various input/output circuitry and receives video (for example, moving image), audio (for example, voice, music, and the like), additional information (for example, EPG, and the like), and the like from the outside of the electronic apparatus 10 under the control of the processor 2010. The input/output interface 2040 may include one of a high-definition multimedia interface (HDMI) port 2041, a component jack 2042, a PC port 2043, and a universal serial bus (USB) port 2044. The input/output interface 2040 may include a combination of the HDMI port 2041, the component jack 2042, the PC port 2043, and the USB port 2044.

The video processor 2050 may include various video processing circuitry and process an image to be displayed by the display 2060, and may perform various kinds of image processing such as decoding, scaling, noise filtering, frame rate conversion, resolution conversion, and the like, on video data.

The audio processor 2070 may include various audio processing circuitry and performs processing on audio data. The audio processor 2070 may perform various kinds of processing, such as decoding, amplification, and noise filtering, on the audio data.

The audio output interface 2080 may include various audio output circuitry and output audio included in the broadcasting signal received through the tuner 2015 under the control of the processor 2010, audio input through the communication interface 2020 or the input/output interface 2040, and audio stored in the memory 2090. The audio output interface 2080 may include at least one of a speaker 2081, a headphone output terminal 2082, or a Sony/Philips digital interface (S/PDIF) output terminal 2083.

The memory 2090 according to an embodiment may store a program for processing and controlling the processor 2010 and may store data input to the electronic apparatus 10 or output from the electronic apparatus 10.

The memory 2090 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Various embodiments of the disclosure may be implemented by software including one or more instructions stored in a storage medium that can be read by a machine (for example, electronic apparatus 10). For example, the processor (for example, processor 410) of the machine (for example, electronic apparatus 10) may call and execute at least one of one or more instructions stored from the storage medium. This makes it possible for the machine to be operated to perform at least one function according to the at least one instruction called. The one or more instructions may include codes made by a compiler or codes executable by an interpreter. The machine-readable storage medium may be provided in a form of a non-transitory storage medium. The 'non-transitory' storage medium is a tangible device, and may not include a signal (for example, electromagnetic waves), and the term does not distinguish between the case where data is stored semi-permanently on a storage medium and the case where data is temporarily stored thereon.

According to an embodiment, the methods according to various embodiments disclosed in the document may be included in a computer program product and provided. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smartphones) online. In a case of the online distribution, at least some of the computer program products may be at least temporarily stored in a machine-readable storage medium such as a memory of a server of a manufacturer, a server of an application store, or a relay server or be temporarily created.

According to various embodiments, each component (for example, module or program) of the above-described components may include one entity or a plurality of entities. According to various embodiments, one or more components or operations among the above-described corresponding components may be omitted, or one or more other components or operations may be added. Alternatively or additionally, a plurality of components (for example, module or program) may be integrated into a single component. In this case, the integrated component may perform one or more functions of each component of the plurality of components in the same as or similar to that performed by the corresponding component among the plurality of components prior to the integration. According to various embodiments, operations performed by a module, a program, or other components may be executed sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic apparatus, comprising:
   at least one processor; and
   at least one memory,
   wherein the at least one memory comprises at least one instruction which, when executed, causes the at least one processor to:
   identify a feature of at least one object included in a first image,
   identify a feature of at least one object included in a second image, the second image being acquired by applying the first image to a first neural network,
   determine an image processing method based on the identification,
   acquire a plurality of third images based on the determined image processing method,
   acquire a fourth image by applying the first image to a second neural network; and
   control a display to display the plurality of third images during the acquiring of the fourth image, and
   control the display to display the fourth image after displaying the plurality of third images.

2. The electronic apparatus of claim 1, wherein the feature of the object comprises at least one of a shape, color, or texture of the object.

3. The electronic apparatus of claim 1, wherein the at least one instruction, when executed, causes the at least one processor to:
   change a color of the object included in the first image using a color of the object included in the second image, and
   acquire the plurality of third images using a shape and texture of the object included in the first image.

4. The electronic apparatus of claim 1, wherein the at least one instruction, when executed, causes the at least one processor to determine a number of the plurality of third images to acquire based on a time for the second neural network to acquire the fourth image.

5. The electronic apparatus of claim 1, wherein the first neural network and the second neural network are neural networks trained using, as training data, an original image, an image to be referenced by the original image, and a result image changed by reflecting a style of the image to be referenced, to acquire a new image by changing the image to a style of a reference style image.

6. The electronic apparatus of claim 1, further comprising the display,
   wherein the at least one instruction, when executed, causes the at least one processor to control the display to display the plurality of third images in an acquired order.

7. The electronic apparatus of claim 1, wherein the at least one instruction, when executed, causes the at least one processor to perform image processing to increase similarity to the fourth image on a last acquired third image among the plurality of third images.

8. The electronic apparatus of claim 1, wherein the at least one instruction, when executed, causes the at least one processor to control the display to display the plurality of third images and the fourth image based on the electronic apparatus entering a sleep state.

9. The electronic apparatus of claim 1, wherein the at least one instruction, when executed, causes the at least one processor to reduce a resolution of the first image and apply the first image to the first neural network to acquire the second image.

10. The electronic apparatus of claim 1, wherein the at least one instruction, when executed, causes the at least one processor to control the display to provide a user interface guiding a selection of the first image and a reference system image.

11. An electronic apparatus, comprising:
    at least one processor;
    at least one memory; and
    a communication interface comprising communication circuitry,
    wherein the at least one memory comprises the at least one instruction, which when executed, causes the at least one processor to:
    identify a feature of at least one object included in a first image;
    identify a feature of at least one object included in a second image, the second image being acquired by applying the first image to a first neural network;
    determine an image processing method based on the identification;
    acquire a plurality of third images based on the determined image processing method;
    control the communication interface to transmit the first image to a server and acquire, from the server, a fourth image acquired by allowing the server to apply the first image to a second neural network;
    control a display to display the plurality of third images during the acquiring of the fourth image from the server; and
    control the display to display the fourth image after displaying the plurality of third images.

12. The electronic apparatus of claim 11, wherein the at least one instruction, when executed, causes the at least one processor to estimate a time required for the server to acquire the fourth image to adjust a number of third images to be acquired or a display time of the plurality of third images.

13. A method of controlling an electronic apparatus, comprising:
- identifying a feature of at least one object included in a first image;
- identifying a feature of at least one object included in a second image, the second image being acquired by applying the first image to a first neural network;
- determining an image processing method based on the identification;
- acquiring a plurality of third images based on the determined image processing method;
- acquiring a fourth image by applying the first image to a second neural network; and
- controlling a display to display the plurality of third images during the acquiring of the fourth image, and
- controlling the display to display the fourth image after displaying the plurality of third images.

14. The method of the electronic apparatus of claim 13, further comprising:
- changing a color of the object included in the first image using a color of the object included in the second image, and
- acquiring the plurality of third images using a shape and texture of the object included in the first image.

15. The method of the electronic apparatus of claim 13, further comprising:
- determine a number of the plurality of third images to acquire based on a time for the second neural network to acquire the fourth image.

16. The method of the electronic apparatus of claim 13, wherein the first neural network and the second neural network include a neural network trained using, as training data, an original image, an image to be referenced by the original image, and a result image being changed by reflecting a style of the image to be referenced, to acquire a new image by changing the image to a style of a reference style image.

17. The method of the electronic apparatus of claim 13, further comprising:
- displaying the plurality of third images on the display in an acquired order.

18. The method of the electronic apparatus of claim 13, further comprising:
- performing image processing to increase similarity to the fourth image on a last acquired third image among the plurality of third images.

19. The method of the electronic apparatus of claim 13, further comprising:
- displaying the plurality of third images and the fourth image on the display based on the electronic apparatus entering a sleep state.

20. The method of the electronic apparatus of claim 13, wherein acquiring the fourth image includes:
- transmitting the first image to a server and acquiring, from the server, the fourth image acquired by allowing the server to apply the first image to the second neural network.

* * * * *